(12) United States Patent
Hattori

(10) Patent No.: US 12,145,072 B2
(45) Date of Patent: Nov. 19, 2024

(54) LOGGING VIRTUAL GAME EVENTS

(71) Applicant: NINTENDO CO., LTD., Kyoto (JP)

(72) Inventor: Yurie Hattori, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 17/949,700

(22) Filed: Sep. 21, 2022

(65) Prior Publication Data

US 2023/0110678 A1    Apr. 13, 2023

(30) Foreign Application Priority Data

Oct. 13, 2021 (JP) ................................. 2021-168312

(51) Int. Cl.
| | |
|---|---|
| A63F 13/79 | (2014.01) |
| A63F 13/35 | (2014.01) |
| A63F 13/53 | (2014.01) |
| A63F 13/822 | (2014.01) |

(52) U.S. Cl.
CPC .............. *A63F 13/79* (2014.09); *A63F 13/35* (2014.09); *A63F 13/53* (2014.09); *A63F 13/822* (2014.09); *A63F 2300/303* (2013.01); *A63F 2300/5546* (2013.01)

(58) Field of Classification Search
None
See application file for complete search history.

(56) References Cited

U.S. PATENT DOCUMENTS

2009/0131177 A1*  5/2009  Pearce .................... A63F 13/30
                                                             463/43

OTHER PUBLICATIONS

"You can earn Nook Miles," [online], Nintendo Co., Ltd., [Searched on Sep. 27, 2021], the Internet, <URL: https://play.nintendo.com/news-tips/tips-tricks/animal-crossing-new-horizons-discover-tips/>.

* cited by examiner

*Primary Examiner* — Damon J Pierce
(74) *Attorney, Agent, or Firm* — Scully, Scott, Murphy & Presser, P.C.

(57) ABSTRACT

An information processing system generates at least one virtually arranged object based on at least one event log within a unit period of actual time among event logs about in-game events that occur based on in-game activities in a virtual game space, arranges one or more of the at least one virtually arranged objects in a virtual field which is a unit for generation of an output image to be shown on a display, stores the virtual field together with the one or more of the at least one virtually arranged objects as a past object based on arrangement of a reference number of the virtually arranged objects in the virtual field, and arranging one or more of the at least one virtually arranged objects in another virtual field when the reference number of virtually arranged objects are arranged in the virtual field.

24 Claims, 22 Drawing Sheets

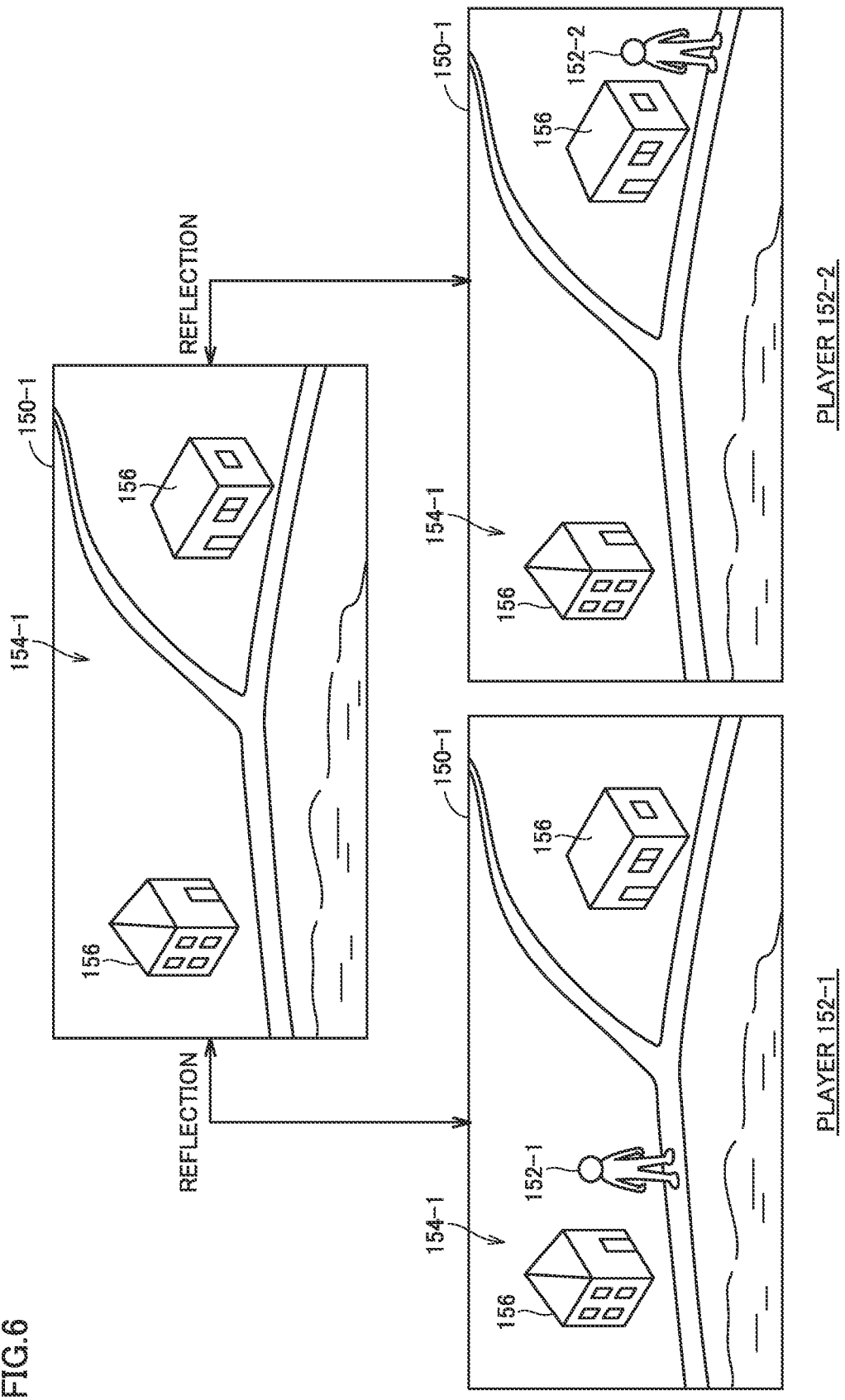

FIG.7A 1160-1

| PlayerID:USR178917 (1162) | | | |
|---|---|---|---|
| 2021/10/2 | 10:00 | CAUGHT CABBAGE BUTTERFLY | P |
| 2021/10/2 | 16:15 | AQUARIUM WAS COMPLETED | A |
| 2021/10/2 | 20:20 | CAUGHT 6 FISH | P |
| ⋮ | ⋮ | ⋮ | ⋮ |

| PlayerID:USR827958 (1162) | | | |
|---|---|---|---|
| 2021/10/2 | 13:00 | UNEARTHED FOSSIL | P |
| 2021/10/2 | 14:20 | CAUGHT 10 FISH | P |
| 2021/10/2 | 18:00 | MUSEUM WAS COMPLETED | A |
| ⋮ | ⋮ | ⋮ | ⋮ |

1165     1164     1166

116

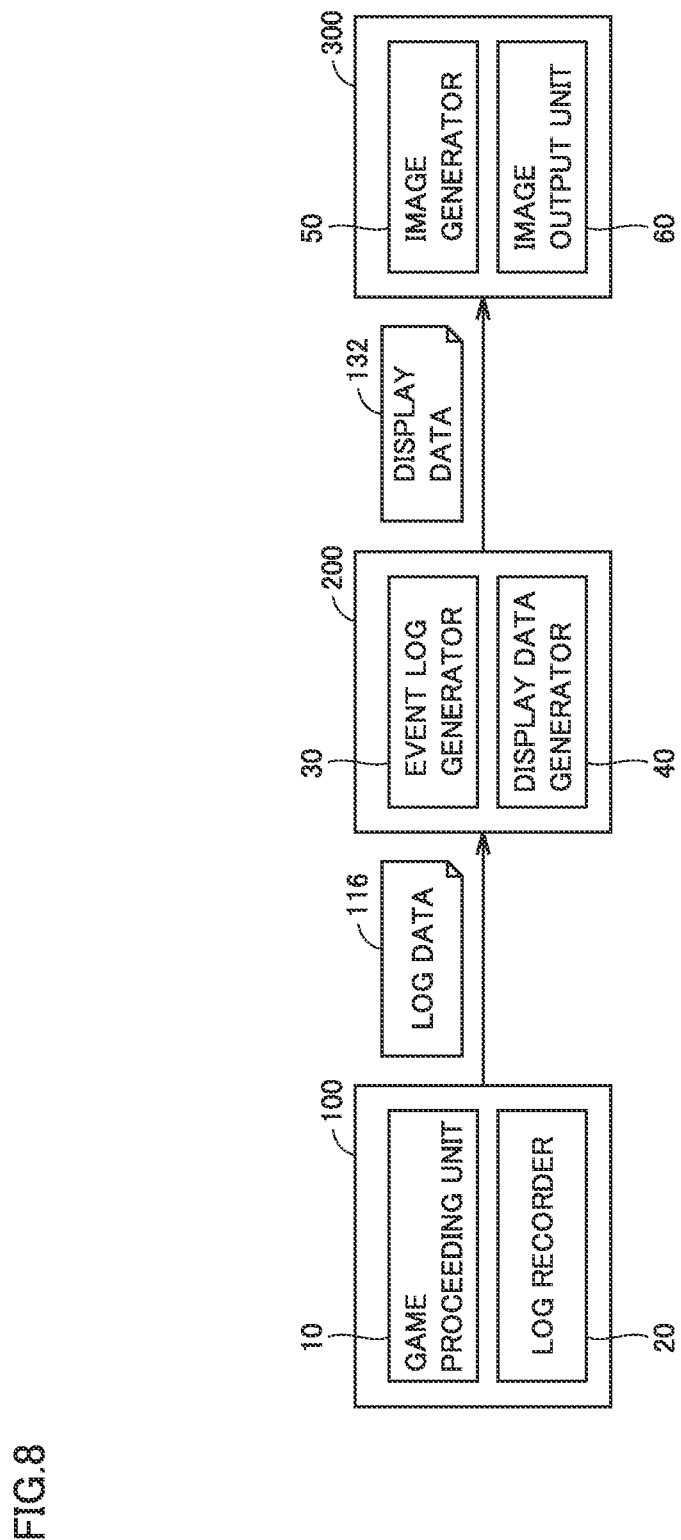

FIG.16

| TIME AND DAY | IN-GAME EVENT | ADDITIONAL INFORMATION | SCORE | RANK |
|---|---|---|---|---|
| 2021/10/5 | SOWED FLOWER SEEDS | PlayerID:USR178917 | 17 | 2 |
| 2021/10/5 | CAUGHT LOBSTER | PlayerID:USR178917 | 15 | 3 |
| 2021/10/5 | MADE BEEHIVE | PlayerID:USR178917 | 9 | 6 |
| 2021/10/5 | CAUGHT THREE CRUCIAN CARP AND TWO POP-EYED GOLDFISH | PlayerID:USR178917 | 20 | 1 |
| 2021/10/5 | UNEARTHED FOSSIL | PlayerID:USR178917 | 12 | 5 |
| 2021/10/5 | BUILT BRIDGE | PlayerID:USR827958 | 14 | 4 |
| 2021/10/5 | SALE AT ISLAND STORE WAS STARTED | SpaceID:AR28978 | 8 | 7 |

```
─<field>VIRTUAL FIELD 1 ～ 1321
├ <AREA 1>
│   ├ 2021/10/01 ── 1323          ⎫
│   ├ TEXT 1          ⎫           ⎬ ～ 1322-1
│   ├ IMAGE DATA 1    ⎬ ～ 48     ⎭
├ <AREA 2>
│   ├ 2021/10/02 ── 1323          ⎫
│   ├ TEXT 2          ⎫           ⎬ ～ 1322-2
│   ├ IMAGE DATA 2    ⎬ ～ 48     ⎭
│
    ⋮
```

LOGGING VIRTUAL GAME EVENTS

This non-provisional application is based on Japanese Patent Application No. 2021-168312 filed with the Japan Patent Office on Oct. 13, 2021, the entire contents of which are hereby incorporated by reference.

FIELD

The present disclosure relates to an information processing system, an information processing apparatus, a medium having an information processing program stored thereon, and an information processing method.

BACKGROUND AND SUMMARY

A scheme that allows subsequent checking of an event that occurs in a game executed in a game device has been known. For example, in a known service, a record of an event (fishing or the like) that occurs in the game remains together with a date.

Though an event that occurs in the game can be checked in the known service described above, from a point of view of facilitated checking of various records in the past, there is a room for improvement.

The present disclosure is directed to providing a scheme that facilitates checking of various records in the past.

An exemplary embodiment provides an information processing system that includes a memory storing a computer-readable program and one or more processors. The one or more processors, when executing the computer-readable program, perform generating at least one virtually arranged object based on at least one event log within a unit period of actual time among event logs about in-game events that occur based on in-game activities in a virtual game space, arranging one or more of the at least one virtually arranged objects in a virtual field which is a unit for generating an output image to be shown on a display, storing the virtual field together with the one or more of the at least one virtually arranged objects as a past object based on arrangement of a reference number of virtually arranged objects in the virtual field, arranging one or more of the at least one virtually arranged objects in another virtual field when the reference number of virtually arranged objects are arranged in the virtual field, and generating the output image based on at least one of the virtual field or the another virtual field.

According to this configuration, the at least one virtually arranged object is generated based on the event log within the unit period of actual time, and the output image which is a result of arrangement of one or more virtually arranged object(s) in the virtual field and/or the another virtual field is shown on the display. Therefore, the user more readily checks various records in the past.

The arranging one or more of the at least one virtually arranged objects in the virtual field may include arranging a blank field object in number short of the reference number in the virtual field when the number of virtually arranged objects arranged in the virtual field is smaller than the reference number and arranging a virtually arranged object at a position of the blank field object when a virtually arranged object is newly arranged in the virtual field. According to this configuration, even when the number of virtually arranged objects is short of the reference number, the blank field object is arranged in the virtual field, which can have a user feel like filling the blank such that the number of virtually arranged objects reaches the reference number.

The arranging one or more of the at least one virtually arranged objects in the virtual field may include maintaining the position of the blank field object until the reference number of virtually arranged objects are arranged in the virtual field when one or more virtually arranged objects is/are arranged in the virtual field. According to this configuration, since the position of the arranged virtually arranged object is maintained, the blank field object is successively updated with the virtually arranged object. Difficulty in checking due to change of the position of the already arranged virtually arranged object depending on timing of viewing of the virtual field can be prevented.

The generating the output image may include generating the output image based on a past object designated by a user when there is a plurality of the past objects. According to this configuration, an output image of any virtual field stored as the past object can be outputted. Therefore, the user can recall the user's own past experience in the virtual game space.

The generating the at least one virtually arranged object may include generating one virtually arranged object based on the event log on one day. According to this configuration, since one virtually arranged object is added every day, the user can be motivated to check the virtually arranged object every day.

The generating the at least one virtually arranged object may include generating the at least one virtually arranged object based on an event log determined based on a priority set for each event among the event logs. According to this configuration, an experience to preferentially be provided to the user among the user's past experiences in the virtual game space is more readily provided.

The generating the at least one virtually arranged object may include generating the at least one virtually arranged object different in content, based on a size of an area where a virtually arranged object is arranged. According to this configuration, since a virtually arranged object is generated in accordance with the size of the area included in the virtual field, the virtually arranged object can be prepared depending on various sizes of the areas and variations of expressions can be increased.

The arranging one or more of the at least one virtually arranged objects in the another virtual field occurs when seven virtually arranged objects are arranged in the virtual field. According to this configuration, virtually arranged objects are arranged in another virtual field each time seven virtually arranged objects are arranged. Since one week defines one unit, a motivation to play a game every day can be enhanced.

The arranging one or more of the at least one virtually arranged objects in the virtual field may include arranging in the virtual field, also after the one or more virtually arranged objects is arranged in the virtual field, based on an operation by a user, instead of a virtually arranged object, another virtually arranged object generated based on an event included in the event log within the unit period identical to the unit period within which the one or more virtually arranged objects was/were generated. According to this configuration, instead of a virtually arranged object arranged in advance, another virtually arranged object can also be checked. Even when a virtual object unintended by the user is arranged, the user can make correction.

The arranging one or more of the at least one virtually arranged objects in the virtual field may include arranging in the virtual field, also after the virtual field is stored as the past object, based on the operation by the user, instead of a virtually arranged object, another virtually arranged object generated based on the event included in the event log within the unit period identical to the unit period within which the one or more virtually arranged objects was/were generated. According to this configuration, instead of a virtually arranged object arranged in advance, another virtually arranged object can also be checked. Correction to the virtually arranged object intended by the user can be made also after the virtual field where the virtually arranged object unintended by the user is arranged is stored as the past object.

The information processing system may include at least a game device in which the event log is recorded and an information processing apparatus that generates the output image. According to this configuration, an event in the game can be checked on an information processing apparatus different from a game console, without turning on the game console.

The information processing system may further include a server apparatus that generates the at least one virtually arranged object, arranges one or more of the at least one virtually arranged objects, stores the virtual field, and arrange the one or more of the at least one virtually arranged objects in the another virtual field. According to this configuration, as the server apparatus subjectively performs processing, processing in the game device and the portable apparatus can be lessened.

The game device may transmit the event log and/or information based on the event log to the information processing apparatus and/or the server apparatus. According to this configuration, information on an event that occurs in the virtual space provided by the game device can readily be collected.

Another exemplary embodiment provides an information processing apparatus that includes a memory storing a computer-readable program and one or more processors. The one or more processors, when executing the computer-readable program, perform generating at least one virtually arranged object based on at least one event log within a unit period of actual time among event logs about in-game events that occur based on in-game activities in a virtual game space, arranging one or more of the at least one virtually arranged objects in a virtual field which is a unit for generating an output image to be shown on a display, storing the virtual field together with the one or more of the at least one virtually arranged objects as a past object based on arrangement of a reference number of virtually arranged objects in the virtual field, arranging one or more of the at least one virtually arranged objects in another virtual field when the reference number of virtually arranged objects are arranged in the virtual field, and transmitting at least one of the virtual field or the another virtual field.

Another exemplary embodiment provides a non-transitory computer-readable storage medium with an executable information processing program stored thereon, the program causing one or more processors to perform generating at least one virtually arranged object based on at least one event log within a unit period of actual time among event logs about in-game events that occur based on in-game activities in a virtual game space, arranging one or more of the at least one virtually arranged objects in a virtual field which is a unit for generating an output image to be shown on a display, storing the virtual field together with the one or more of the at least one virtually arranged objects as a past object based on arrangement of a reference number of virtually arranged objects in the virtual field, arranging one or more of the at least one virtually arranged objects in another virtual field when the reference number of virtually arranged objects are arranged in the virtual field, and transmitting at least one of the virtual field or the another virtual field.

Another exemplary embodiment provides an information processing method performed in an information processing apparatus. The information processing method includes generating at least one virtually arranged object based on at least one event log within a unit period of actual time among event logs about in-game events that occur based on in-game activities in a virtual game space, arranging one or more of the at least one virtually arranged objects in a virtual field which is a unit for generating an output image to be shown on a display, storing the virtual field together with the one or more of the at least one virtually arranged objects as a past object based on arrangement of a reference number of the virtually arranged objects in the virtual field, arranging one or more of the at least one virtually arranged objects in another virtual field when the reference number of virtually arranged objects are arranged in the virtual field, and transmitting at least one of the virtual field or the another virtual field. The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A, 5B, and 6 show exemplary illustrative non-limiting drawings each illustrating an exemplary virtual game space provided in the information processing system according to the present embodiment.

FIGS. 7A and 7B show exemplary illustrative non-limiting drawings each illustrating an exemplary configuration of log data generated in the information processing system according to the present embodiment.

FIG. 8 shows an exemplary illustrative non-limiting drawing illustrating an exemplary functional configuration involved with providing in-game information based on an event log in the information processing system according to the present embodiment.

FIG. 16 shows an exemplary illustrative non-limiting drawing illustrating exemplary processing for extracting an in-game event corresponding to an article object in the information processing system according to the present embodiment.

FIG. 18 shows an exemplary illustrative non-limiting drawing illustrating an exemplary data structure of display data in the information processing system according to the present embodiment.

DETAILED DESCRIPTION OF NON-LIMITING EXAMPLE EMBODIMENTS

Figure 1:
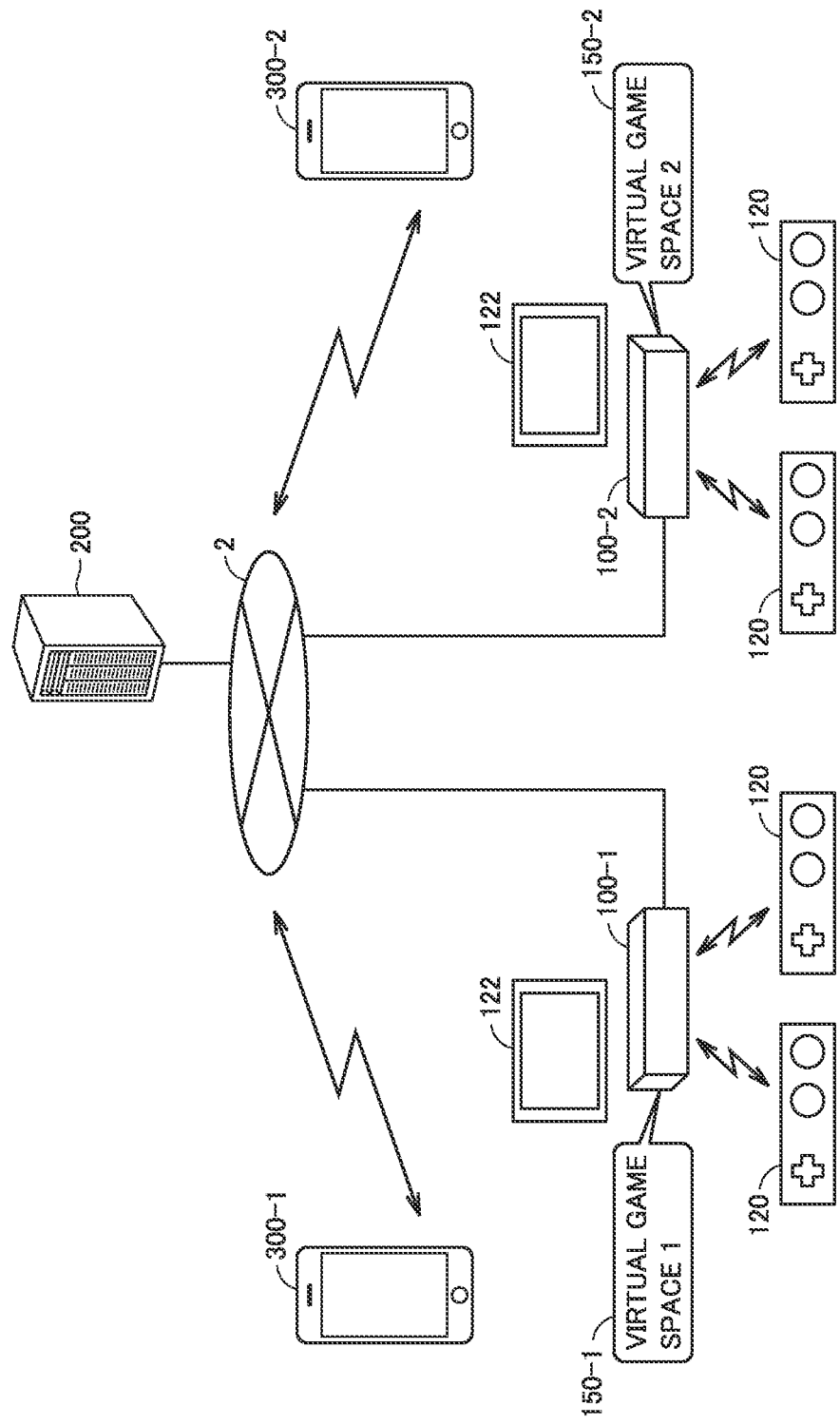
FIG. 1 shows an exemplary illustrative non-limiting drawing illustrating an overall configuration of an information processing system according to the present embodiment.

The present embodiment will be described in detail with reference to the drawings. The same or corresponding elements in the drawings have the same reference characters allotted and description thereof will not be repeated.

[A. Exemplary Overall Configuration]

An exemplary overall configuration of an information processing system 1 according to the present embodiment will initially be described.

Referring to FIG. 1, information processing system 1 includes one or more game devices 100-1, 100-2, ... (which are also collectively referred to as a "game device 100" below) and a server apparatus 200 that can be connected to one or more game devices 100 over a network 2. Information processing system 1 includes one or more portable apparatuses 300-1, 300-2, ... (which are also collectively referred to as a "portable apparatus 300" below) that can be connected to server apparatus 200 over network 2.

Each game device 100 can be connected to one or more controllers 120. Connection between game device 100 and controller 120 may be wireless or wired connection.

Each game device 100 proceeds with a game in accordance with an operation performed by a user onto controller 120. Game device 100 is connected to a display 122. A result of proceeding of the game by game device 100 is shown on display 122.

Each game device 100 executes a game program to provide virtual game spaces 150-1, 150-2, ... (which are also collectively referred to as a "virtual game space 150" below). A user enjoys the game by controlling a character in virtual game space 150 with the use of controller 120.

Server apparatus 200 obtains data from game device 100 and provides data to game device 100. Server apparatus 200 mediates data exchange between game devices 100. Server apparatus 200 can also process data obtained from game device 100 to generate in-game information and provide the in-game information to portable apparatus 300.

Portable apparatus 300 presents the in-game information provided by server apparatus 200 to a user. Portable apparatus 300 is implemented, for example, by such an information processing apparatus as a smartphone, a tablet, or a notebook personal computer.

Details of processing for providing the in-game information will be described later.

[B. Exemplary Hardware Configuration]

An exemplary hardware configuration of each apparatus included in information processing system 1 according to the present embodiment will now be described.

(b1: Game Device 100)

Figure 2:
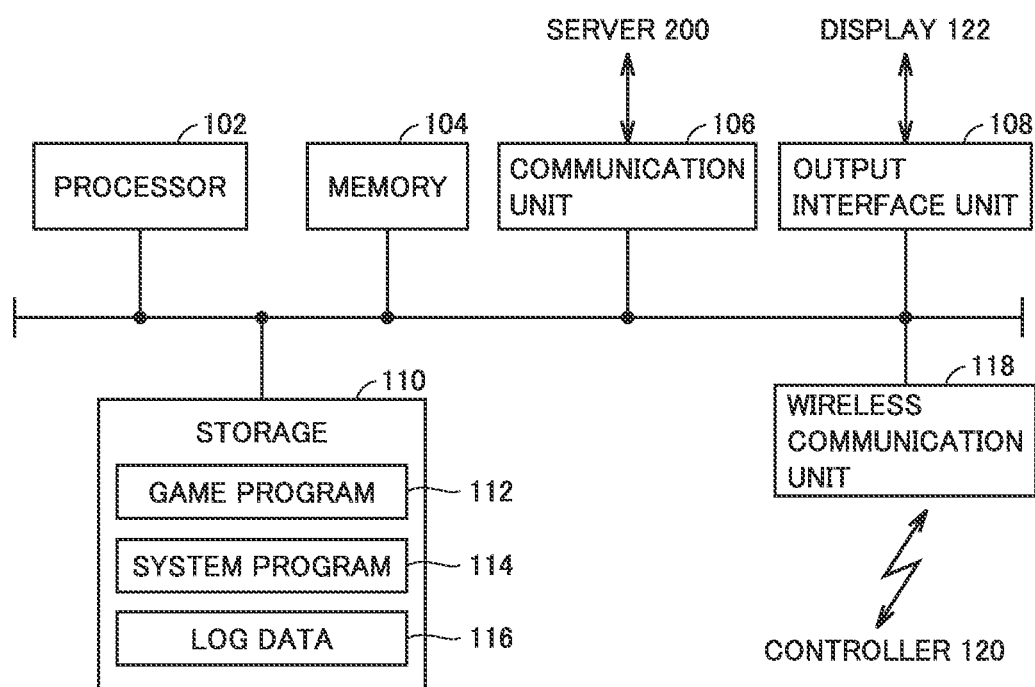
FIG. 2 shows an exemplary illustrative non-limiting drawing illustrating a hardware configuration of a game device of the information processing system according to the present embodiment.

Referring to FIG. 2, game device 100 represents an exemplary computer, and includes, as its main components, one or more processors 102, a memory 104, a communication unit 106, an output interface unit 108, a storage 110, and a wireless communication unit 118.

Processor 102 is a processing entity for performing processing provided by game device 100. Processor 102 performs processing as will be described later by reading a game program 112 stored in storage 110 and developing the game program on memory 104. Game program 112 includes an instruction code for performing processing as will be described later.

Memory 104 is a storage device that can be accessed by processor 102, and it is implemented, for example, by a volatile storage device such as a dynamic random access memory (DRAM) or a static random access memory (SRAM). Storage 110 is implemented, for example, by a non-volatile storage device such as a flash memory. A system program 114 that provides a library necessary for execution of game program 112 by processor 102 may be stored in storage 110.

Log data 116 generated by execution of game program 112 is stored in storage 110. Details of log data 116 will be described later.

Communication unit 106 exchanges data with server apparatus 200.

Output interface unit 108 provides a video signal and an audio signal to display 122.

Wireless communication unit 118 exchanges data with controller 120. More specifically, wireless communication unit 118 receives a signal in accordance with an operation performed by a user onto controller 120.

(b2: Server Apparatus 200)

Figure 3:
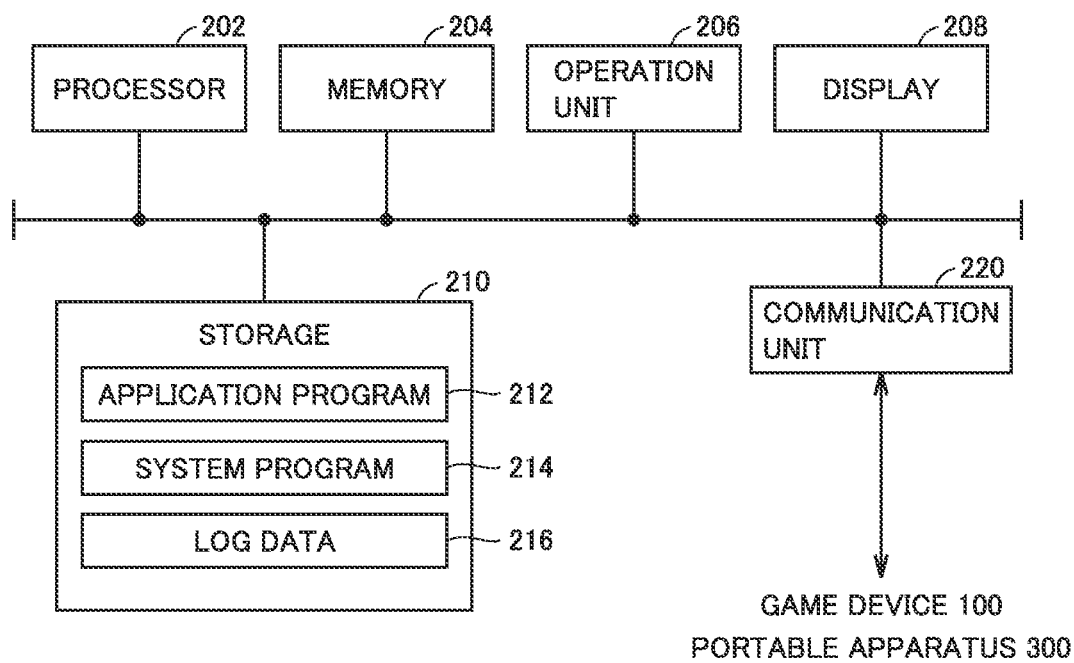
FIG. 3 shows an exemplary illustrative non-limiting drawing illustrating a hardware configuration of a server apparatus of the information processing system according to the present embodiment.

Referring to FIG. 3, server apparatus 200 represents an exemplary computer, and includes, as its main components, one or more processors 202, a memory 204, an operation unit 206, a display 208, a storage 210, and a communication unit 220.

Processor 202 is a processing entity for performing processing provided by server apparatus 200. Processor 202 performs processing as will be described later by reading an application program 212 stored in storage 210 and developing the application program on memory 204. Application program 212 includes an instruction code for performing processing as will be described later.

Memory 204 is a storage device that can be accessed by processor 202, and it is implemented, for example, by a volatile storage device such as a DRAM or an SRAM. Storage 210 is implemented, for example, by a non-volatile storage device such as a hard disk or a solid state drive. A system program 214 that provides a library necessary for execution of application program 212 by processor 202 may be stored in storage 210.

Operation unit 206 is a component that accepts an operation by the user and implemented by such a device as a keyboard and/or a mouse.

Display 208 is a component that shows a result of processing by processor 202 and implemented, for example, by a liquid crystal display.

Communication unit 220 exchanges data over a wireless signal with game device 100 and portable apparatus 300.

(b3: Portable Apparatus 300)

Figure 4:
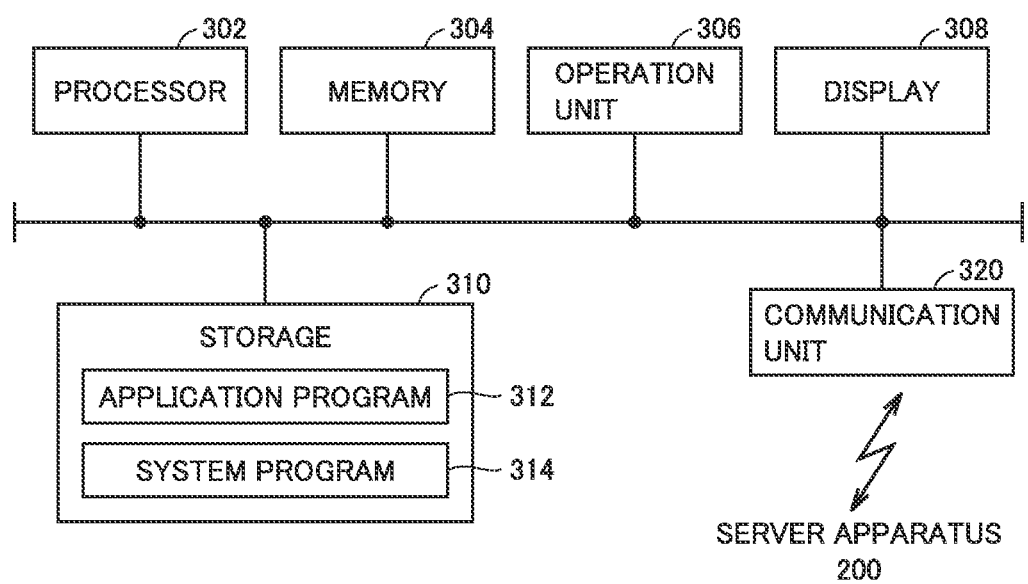
FIG. 4 shows an exemplary illustrative non-limiting drawing illustrating a hardware configuration of a portable apparatus of the information processing system according to the present embodiment.

Referring to FIG. 4, portable apparatus 300 represents an exemplary computer, and includes, as its main components, one or more processors 302, a memory 304, an operation unit 306, a display 308, a storage 310, and a communication unit 320.

Processor 302 is a processing entity for performing processing provided by portable apparatus 300. Processor 302 performs processing as will be described later by reading an application program 312 stored in storage 310 and developing the application program on memory 304. Application program 312 includes an instruction code for performing processing as will be described later.

Memory 304 is a storage device that can be accessed by processor 302, and it is implemented, for example, by a volatile storage device such as a DRAM or an SRAM. Storage 310 is implemented, for example, by a non-volatile storage device such as a flash memory. A system program 314 that provides a library necessary for execution of application program 312 by processor 302 may be stored in storage 310.

Operation unit 306 is a component that accepts an operation by the user and implemented by such a device as a push button, a control lever, a touch panel, and/or a mouse.

Display 308 is a component that shows a result of processing by processor 302 and implemented, for example, by a liquid crystal display.

Communication unit 320 exchanges data over a wireless signal with server apparatus 200.

(b4: Others)

The term "processor" herein encompasses not only an ordinary meaning of a processing circuit that performs processing in accordance with an instruction code described in a program, such as a central processing unit (CPU), a micro processing unit (MPU), or a graphics processing unit (GPU), but also hard-wired circuitry such as an application specific integrated circuit (ASIC) or a field programmable gate array (FPGA). In the hard-wired circuitry such as an ASIC or an FPGA, a circuit corresponding to processing to be executed is formed in advance. Furthermore, the "processor" herein also encompasses circuitry in which a plurality of functions are integrated, such as a system on chip (SoC) or combination of a processor in a narrow sense and hard-wired circuitry.

[C. Virtual Game Space]

Exemplary virtual game space 150 provided in information processing system 1 according to the present embodiment will now be described.

Figure 5A:
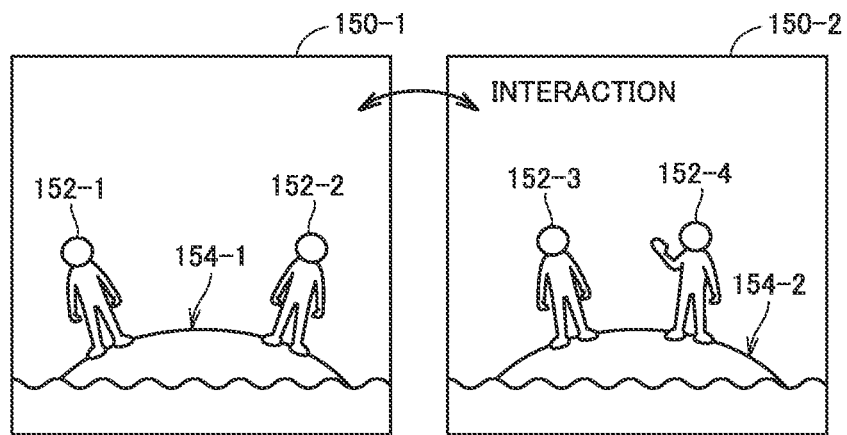

FIG. 5A shows exemplary virtual game space 150-1 provided by game device 100-1 and an exemplary virtual game space provided by game device 100-2. Virtual game space 150 may be configured, for example, as an island.

The term "player" herein encompasses both of a character controlled by a user in virtual game space 150 and a user who controls the character. The user can obtain an experience as if the user himself/herself performed various activities in virtual game space 150 by controlling the character in virtual game space 150. Therefore, the user who operates controller 120 in the real space and the character in virtual game space 150 controlled by the operation by the user are collectively referred to as the "player."

For example, it is assumed that players 152-1 and 152-2 live on an island in virtual game space 150-1 and players 152-3 and 152-4 live on an island in virtual game space 150-2. Thus, a shared area 154-1 with which players 152-1 and 152-2 are both brought in correspondence is prepared in virtual game space 150-1, and a shared area 154-2 with which players 152-3 and 152-4 are both brought in correspondence is prepared in virtual game space 150-2.

Figure 5B:
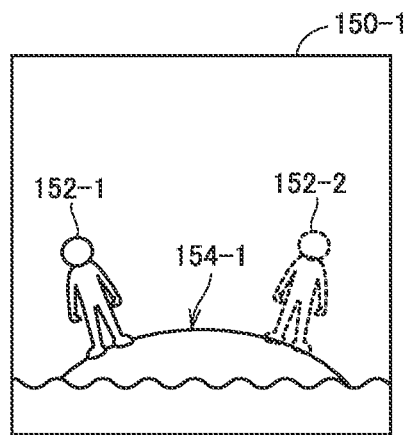

Player 152-1 and player 152-2 do not have to simultaneously be present in shared area 154-1. For example, when the user who controls player 152-1 plays a game, as shown in FIG. 5B, there is no other player 152 in virtual game space 150-1 whereas player 152-1 can perform any in-game activity in virtual game space 150-1.

As shown in FIG. 6, player 152-1 can independently perform any in-game activity in shared area 154-1. Similarly, player 152-2 can independently perform any in-game activity in shared area 154-2.

In shared area 154-1 in virtual game space 150-1, various game objects 156 are arranged, and players 152-1 and 152-2 can freely change a state of arrangement of game objects 156.

Change (change of the state of arrangement of game objects 156) in shared area 154-1 caused by an in-game activity performed by one player 152 is reflected also on shared area 154-1 where other players 152 perform in-game activities.

Player 152-1 and/or player 152-2 can freely change game setting for shared area 154-1 in virtual game space 150-1. Examples of game setting include an ordinance (a rule effective only in shared area 154 of interest) and a melody. Under the ordinance, business hours of a shop and a time period during which player 152 can perform an in-game activity are set or restricted. The melody includes setting of a sound effect at the time when player 152 enters a shop. Such game setting is shared among players 152 who are present in identical shared area 154-1.

The term "game object" herein encompasses all objects modified in accordance with in-game activities performed by player 152 among objects arranged in virtual game space 150. For example, the game object includes a facility and furniture. The facility includes such buildings as shops and museums. Furniture includes not only a bed, a closet, a table, and a home electrical appliance but also a fountain, a slide, and a utility pole. In other words, the furniture may include not only items arranged in a building but also items arranged outside the building.

The term "in-game activity" herein encompasses any activities performed by player 152 in virtual game space 150. The "in-game activity" may correspond to an activity in the real space and examples thereof include swinging a butterfly net, fishing, planting flowers, and donating caught insects or fish (for a specific purpose (for example, completing a specific facility such as a museum)).

More specifically, game object 156 is added, modified, or erased in accordance with a content and a result of an in-game activity performed by player 152-1 or 152-2. Addition, modification, or erasure of game object 156 will change the state of arrangement of game object 156.

Thus, in the game, the state of arrangement of game object 156 arranged in shared area 154-1 is shared between players 152-1 and 152-2. By way of example, game object 156 includes an in-game facility (for example, a shop or a museum) arranged in shared area 154-1 and available to player 152-1 and player 152-2.

The term "in-game event" herein encompasses any event that occurs as a result of a performed in-game activity. The "in-game event" may include an event that reliably occurs as a result of a performed in-game activity and an event that occurs at a prescribed probability. Examples of the "in-game event" include catching a cabbage butterfly, catching ten fish, planting flowers, and completion of a museum.

The term "in-game item" herein encompasses an object acquired as a result of an in-game activity and an object not assumed to be arranged in shared area 154 in virtual game space 150. Examples of the "in-game item" include a cabbage butterfly and a tuna.

In other words, the in-game activity includes an operation by player 152 for acquiring an in-game item. In this case, the in-game event includes acquisition of an in-game item by player 152.

Players 152-1 and 152-2 can perform various in-game activities prepared in advance in shared area 154-1 in virtual game space 150-1 where they live, and similarly, players 152-3 and 152-4 can perform various in-game activities prepared in advance in shared area 154-2 in virtual game space 150-2 where they live.

Players 152-1 and 152-2 can also move from shared area 154-1 in virtual game space 150-1 where they live to shared area 154-2 in virtual game space 150-2. Similarly, players 152-3 and 152-4 can also move from shared area 154-2 in virtual game space 150-2 where they live to shared area 154-1 in virtual game space 150-1. Movement of player 152 between virtual game spaces 150 may be implemented with server apparatus 200 (see FIG. 1) being interposed.

In shared area 154-2 in virtual game space 150-2 where players 152-1 and 152-2 do not live, in-game activities that they can perform are restricted as compared with in-game activities in shared area 154-1 in virtual game space 150-1. In other words, in shared area 154-2 in virtual game space 150-2, players 152-1 and 152-2 are not able to perform all in-game activities that they can perform in shared area 154-1 in virtual game space 150-1. Similarly, in shared area 154-1 in virtual game space 150-1 where players 152-3 and 152-4 do not live, in-game activities that they can perform are restricted as compared with in-game activities in shared area 154-2 in virtual game space 150-2.

Under such restriction on in-game activities that can be performed, for example, when player 152-1 who lives in shared area 154-1 moves to another shared area 154-2, player 152-1 can catch insects or fish, whereas player 152-1 is not allowed to arrange a game object such as furniture or to erase an arranged game object either. Player 152-1 is not allowed to donate caught insects or fish either for completing a specific facility such as a museum.

Players 152-1 and 152-2 are thus both brought in correspondence with shared area 154-1. From a point of view of players 152-1 and 152-2, in virtual game space 150, there are shared area 154-1 relatively high in degree of change of the state of arrangement and shared area 154-2 relatively low in degree of change of the state of arrangement.

An event log based on an in-game event performed as player 152-1 moves to shared area 154-2 may also be included in provided in-game information.

[D. Log Data]

An event log based on an in-game event that occurs in virtual game space 150 is successively recorded as log data 116 (see FIG. 2).

FIGS. 7A and 7B are each a schematic diagram showing an exemplary configuration of log data 116 generated in information processing system 1 according to the present embodiment. FIGS. 7A and 7B show exemplary log data 116 on virtual game space 150-1.

As shown in FIGS. 7A and 7B, log data 116 includes an event log 1160-1 on player 152-1 and an event log 1160-2 on player 152-2.

Event log 1160-1 and event log 1160-2 may be integrated as a single piece of log data 116 or may individually be present. Event logs 1160 as many as players 152 altogether brought in correspondence with shared area 154 in virtual game space 150 are generated.

Event log 1160 includes a player event and an area event. The player event means an event log based on an in-game event (except for an event log based on an area event which will be described later) that occurs as a result of an in-game activity directly performed by player 152 brought in correspondence.

The area event means an event log based on an in-game event that causes change of the state of arrangement of game object 156 in shared area 154 in connection with player 152 brought in correspondence. In other words, event log 1160 encompasses an event log based on an in-game event that occurs based on an in-game activity performed by player 152 brought in correspondence, and among such event logs, an event log based on an in-game event that causes any change of the state of arrangement in shared area 154 is handled as an event log based on an area event.

Conversely, among event logs included in event log 1160, an event log based on an in-game event that does not cause change of the state of arrangement in shared area 154 is handled as an event log based on a player event.

More specifically, event log 1160-1 shown in FIG. 7A is given a player ID 1162 specific to player 152-1 brought in correspondence. Each entry included in event log 1160-1 includes content information 1164 on contents of an in-game event and time and day information 1165 indicating time and day of occurrence of the in-game event. Each entry included in event log 1160-1 is given type information 1166 for distinguishing between a player event and an area event.

Similarly, event log 1160-2 shown in FIG. 7B is given player ID 1162 specific to player 152-2 brought in correspondence. Each entry included in event log 1160-2 includes content information 1164 on contents of an in-game event and time and day information 1165 indicating time and day of occurrence of the in-game event. Each entry included in event log 1160-2 is given type information 1166 for distinguishing between a player event and an area event.

Event log 1160-2 shown in FIG. 7B includes an area event which is completion of a museum. With this area event, another player 152 together brought in correspondence with shared area 154-1 can also visit the completed museum. In other words, the area event corresponds to the in-game event that causes change of the state of arrangement in shared area 154.

Thus, the in-game event (area event) that causes change of the state of arrangement in shared area 154 includes an in-game event that occurs as a result of satisfaction of an arrangement condition for arrangement of game object 156 (a museum in this example) in virtual game space 150.

In addition, such an in-game event that one player 152 performs an in-game activity to invite a non-player character to shared area 154 and consequently the invited non-player character lives in shared area 154 and a building (house) is completed is included.

When it can be determined whether each entry falls under a player event or an area event at the time of use of event log 1160, type information 1166 does not have to be provided in advance. In other words, the player event and the area event may subsequently be distinguished from each other.

As described above, information processing system 1 performs a function to record event log 1160-1 based on an in-game event that occurs based on an in-game activity performed by player 152-1 in shared area 154 and a function to record event log 1160-2 based on an in-game event that occurs based on an in-game activity performed by player 152-2 in shared area 154. A log recorder 20 which will be described later is responsible for these functions.

[E. Providing In-Game Information Through Portable Apparatus 300 Based on Event Log]

Processing for providing in-game information through portable apparatus 300 based on an event log based on an in-game event that occurs in virtual game space 150 will now be described.

(e1: Exemplary Functional Configuration)

In information processing system 1 according to the present embodiment, in-game information is provided through portable apparatus 300 based on an event log based on an in-game event that occurs in virtual game space 150.

It is assumed that an account of player 152-1 in virtual game space 150-1 and an account for accessing server apparatus 200 through portable apparatus 300-1 are identical to each other or linked to each other. In the description below, the accounts are identical to each other or linked to each other and player 152 to which in-game information is provided through portable apparatus 300 is also referred to as a "subject player."

In the description below, portable apparatus 300 is assumed to be brought in correspondence with the subject player.

Referring to FIG. 8, game device 100 includes a game proceeding unit 10 and log recorder 20. Game device 100 transmits log data 116 including event log 1160 of the subject player to server apparatus 200.

Server apparatus 200 includes an event log generator 30 and a display data generator 40. Event log generator 30 generates a processing target event log 130 from log data 116. Display data generator 40 generates display data 132 from processing target event log 130. Display data 132 is raw material data generated based on processing target event log 130 for display on display 308 of portable apparatus 300.

More specifically, display data 132 includes text that describes contents of an in-game event of interest (that defines contents of an article object of interest) and an image showing an in-game event of interest (for example, an icon of caught fish).

Server apparatus 200 transmits as output data, generated display data 132 to portable apparatus 300.

Portable apparatus 300 includes an image generator 50 that generates an output image based on display data 132 and an image output unit 60 that outputs the generated output image to display 308 of portable apparatus 300. The output image is visual expression of in-game information.

(e2: Processing Target Event Log)

Processing for generating processing target event log 130 will now be described.

Figure 9:
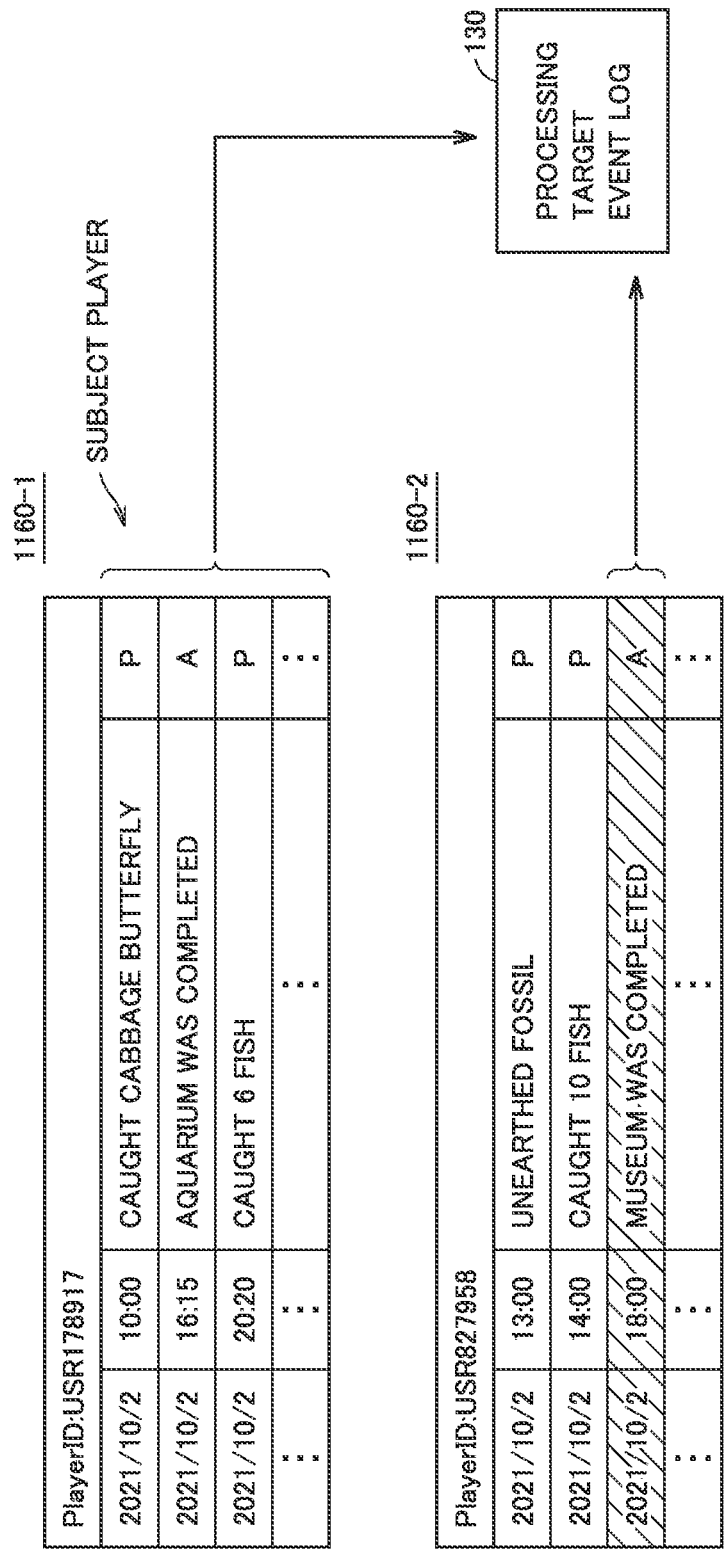
FIG. 9 shows an exemplary illustrative non-limiting drawing illustrating exemplary processing for generating a processing target event log in the information processing system according to the present embodiment.

FIG. 9 shows exemplary processing for generating processing target event log 130 relating to player 152-1, with player 152-1 being defined as the subject player.

As shown in FIG. 9, initially, event log 1160-1 relating to player 152-1 is extracted as processing target event log 130.

From event log 1160-2 relating to player 152-2 different from player 152-1, an event log corresponding to the area event is extracted as processing target event log 130.

Only two players 152-1 and 152-2 who live in shared area 154-1 are illustrated for the sake of convenience of description. When more players 152-3, 152-4, . . . live in shared area 154-1, however, an area event is extracted for each of players 152-2, 152-3, 152-4, . . . as processing target event log 130 relating to player 152-1. The number of players 152 who live in identical shared area 154-1 does not necessarily have to be set to two, and any number not smaller than one may be set.

Thus, processing target event log 130 relating to player 152-1 includes not only an event log based on an in-game event that occurs based on an in-game activity performed by player 152-1 but also an event log based on an in-game event that causes change of the state of arrangement of game object 156 in shared area 154, although player 152-1 is not involved therewith. In other words, processing target event log 130 relating to player 152-1 is composed of an event log relating to player 152-1 (a player event and an area event) and an event log relating to player 152-2 (only an area event).

Therefore, display data 132 directed to player 152-1 that is transmitted from server apparatus 200 to portable apparatus 300 in FIG. 8 includes neither of an event log based on a player event relating to player 152-2 and display data 132 generated based on the player event relating to player 152-2.

(e3: In-Game Information)

Exemplary in-game information provided by information processing system 1 according to the present embodiment will now be described.

The term "in-game information" herein encompasses change that is caused or may be caused in a game by playing of a game by a player. Information processing system 1 provides in-game information of the subject player in a form like a newspaper. Therefore, the provided in-game information may also be referred to as a "newspaper" in the description below for the sake of convenience.

Figure 10:
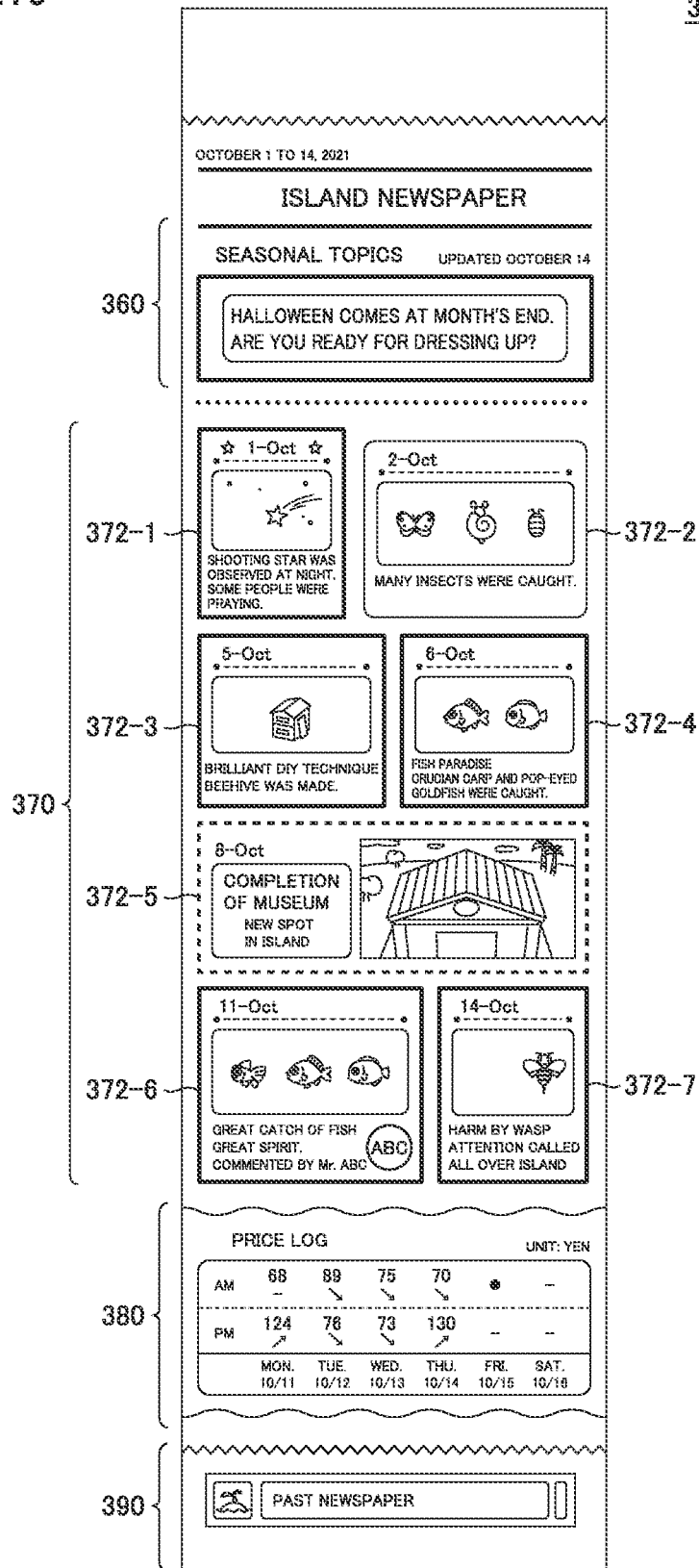
FIG. 10 shows an exemplary illustrative non-limiting drawing illustrating an exemplary screen relating to in-game information provided by the information processing system according to the present embodiment.

Referring to FIG. 10, a title is arranged in an upper portion of a screen 350 and a seasonal topic 360 is arranged under the title.

As topic 360, both of information based on an in-game event that will occur in the future independently of an in-game activity performed by player 152 (future event data) and information based on an in-game event that occurred in the past independently of an in-game activity performed by player 152 (past event data) may be shown. "Independently of an in-game activity" means occurrence irrespective of an in-game activity.

For example, as topic 360, a notification about start of an in-game event a prescribed period later (for example, a seasonal event such as a summer festival in next week) or a report on an in-game event that occurred in the past (for example, such information as blooming of cherry blossoms) may be shown.

An article object group 370 is arranged below seasonal topic 360. Article object group 370 includes a prescribed number of article objects 372-1 to 372-7 (which are also collectively referred to as an "article object 372" below). Article object 372 corresponds to a virtually arranged object.

As will be described later, contents of article object 372 shown on screen 350 may be interchanged. Therefore, article object 372 on screen 350 may also be referred to as a "top article object" in the sense of distinction from an article object which is a candidate for interchange.

Each of article objects 372 is generated as an in-game event of interest is selected every unit period (for example, every day) of actual time based on event log 1160 relating to the subject player and an event log relating to a player other than the subject player (only an event log corresponding to an area event).

A plurality of in-game events may be selected as display candidates for each unit period. In this case, an in-game event shown as the article object on screen 350 may be changed as will be described later.

The number of article objects (top article objects) arranged on screen 350 is determined in advance. For example, if one article object is arranged every day and a newspaper is generated each time a cumulative number of days of play of the game reach seven days, seven article objects are arranged on screen 350. The article objects may be arranged in a predetermined order. In other words, when seven article objects are accumulated, one newspaper is generated. The number of article objects arranged on screen 350 is not limited to seven, and any number can be set.

Thus, if a unit period of actual time is set to one day, information processing system 1 generates one top article object based on event logs on one day.

The article objects introduce events or moves that occur in shared area 154-1 in connection with the subject player by introducing in-game events that occur within a corresponding unit period (for example, one day). By way of example, the article objects each include a date of occurrence of an in-game event of interest, text describing contents of the in-game event of interest, and an image showing the in-game event of interest.

When any of article objects 372-1 to 372-7 arranged on screen 350 is selected, details of the selected article object may be shown.

A price log 380 is arranged below article object group 370. Price log 380 shows time-series information of a selling price of a specific in-game item in virtual game space 150. The selling price of the specific in-game item is randomly varied twice a day (in the morning and in the afternoon). In other words, an in-game event to determine a selling and buying price of a specific in-game item is performed independently of an in-game activity performed by player 152. This change over time in selling price is shown in price log 380.

Price log 380 shows time-series information on a price in a week including a date corresponding to a latest article object among article objects shown on screen 350. Price log 380 shows prices in the past that can be referred to at a time point when screen 350 is shown. Price log 380 thus shows information based on transition of the price of the in-game item that varies every prescribed cycle. In other words, price log 380 corresponds to information based on in-game events that occurred in the past (past event data) independently of an in-game activity performed by player 152.

Information processing system 1 records data based on an in-game event that will occur in the future independently of an in-game activity performed by player 152 and data based on an in-game event that occurred in the past independently of an in-game activity performed by player 152. As the data based on the independent event is processed, contents shown as topic 360 and price log 380 are generated.

Contents shown as topic 360 may include both of information based on an in-game event that will occur in the future (future event data) and information based on an in-game event that occurred in the past (past event data). Contents shown as price log 380 include information based on an in-game event that occurred in the past (past event data). The data based on the independent event thus includes at least any of the future event data and the past event data.

A past reference button 390 for referring to a past newspaper is arranged below price log 380.

Figure 11:
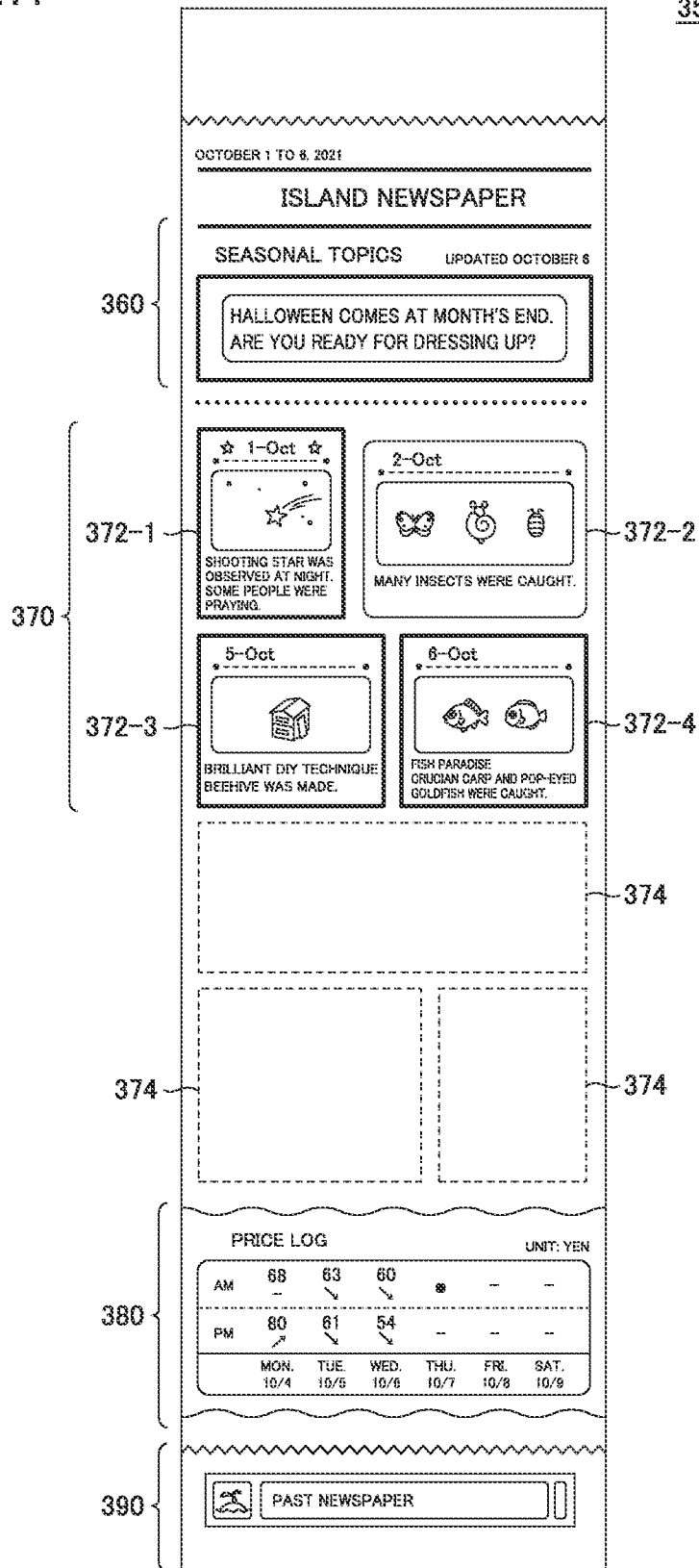
FIG. 11 shows an exemplary illustrative non-limiting drawing illustrating another exemplary screen relating to in-game information provided by the information processing system according to the present embodiment.

FIG. 11 shows another exemplary screen relating to in-game information provided by information processing system 1 according to the present embodiment. A screen 350A shown in FIG. 11 shows a state that four article objects have been generated and arranged since start of generation of a newspaper. In other words, four article objects 372-1 to 372-4 alone are arranged on screen 350A. In an area where no article object is arranged, a blank field object 374 is arranged in a space where an article object will be arranged.

Blank field object 374 does not necessarily have to be arranged. When blank field object 374 is not arranged, an area where article object 372 is not arranged may be left blank. Alternatively, an area where article object 372 is not arranged may not be shown on screen 350. In this case, a length of screen 350 may vary depending on the number of article objects 372.

Figure 12A:
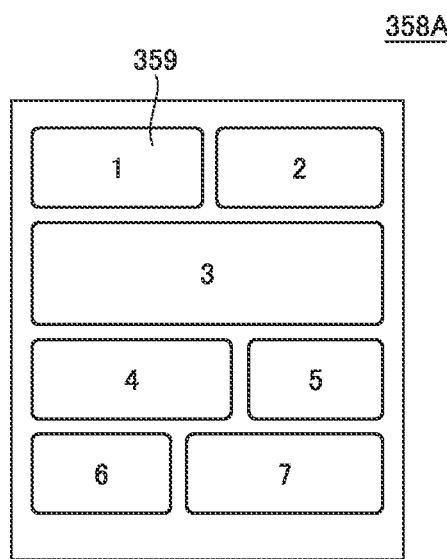
FIGS. 12A and 12B show exemplary illustrative non-limiting drawings each illustrating an exemplary screen layout relating to in-game information provided by the information processing system according to the present embodiment.
Figure 12B:
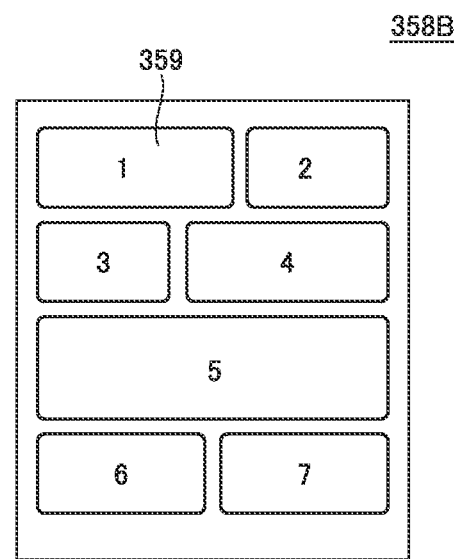

As shown in FIGS. 12A and 12B, a virtual field 358A and a virtual field 358B representing screen layouts are each a unit for generation of an output image to be shown on display 308 of portable apparatus 300. In virtual field 358A and virtual field 358B, a prescribed number of areas 359 where article objects are to be arranged are defined. In each area 359, an order of arrangement of article objects is determined in advance (a figure in virtual field 358 means the order of arrangement).

When a condition for generation of a new newspaper is satisfied, server apparatus 200 selects one of a plurality of virtual field candidates and arranges an article object. Without being limited to the virtual fields shown in FIGS. 12A and 12B, any virtual field can be adopted. Any number of virtual fields may be provided.

In addition, the number and a range of areas to be arranged in the virtual field may dynamically be determined.

When an article object is arranged in the virtual field, a size of an area where the article object is arranged is fixed (does not vary). When a prescribed condition is satisfied, however, the size of the area may be changed as appropriate after arrangement. Furthermore, the layout may be varied each time an article object is added. In this case, one or more layouts may be prepared in advance for each number of arranged article objects.

Figure 13:
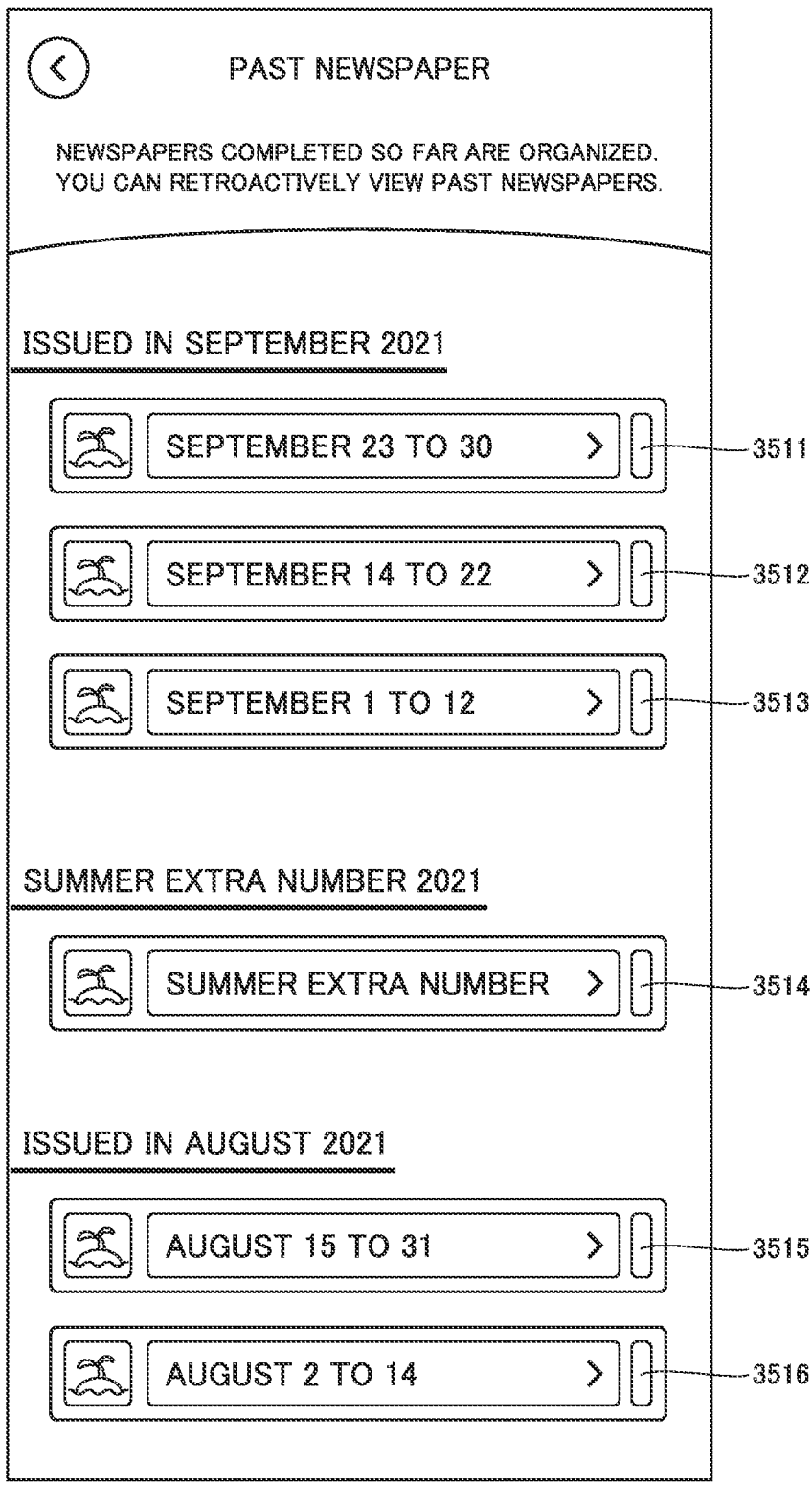
FIG. 13 shows an exemplary illustrative non-limiting drawing illustrating an exemplary screen for referring to past information provided by the information processing system according to the present embodiment.

Referring to FIG. 13, buttons 3511 to 3516 for showing newspapers generated in the past are shown on a screen 351.

Each of buttons 3511 to 3516 shows a period of article objects included in a newspaper brought in correspondence. When any of buttons 3511 to 3516 is selected, a corresponding newspaper in the past is shown.

A "summer extra number" allocated to button 3514 is a newspaper in which a prescribed number of article objects extracted every predetermined period (for example, every three months) from article objects included in newspapers generated during the predetermined period are arranged. Thus, unlike a normal newspaper, another newspaper may be generated every predetermined period.

Figure 14:
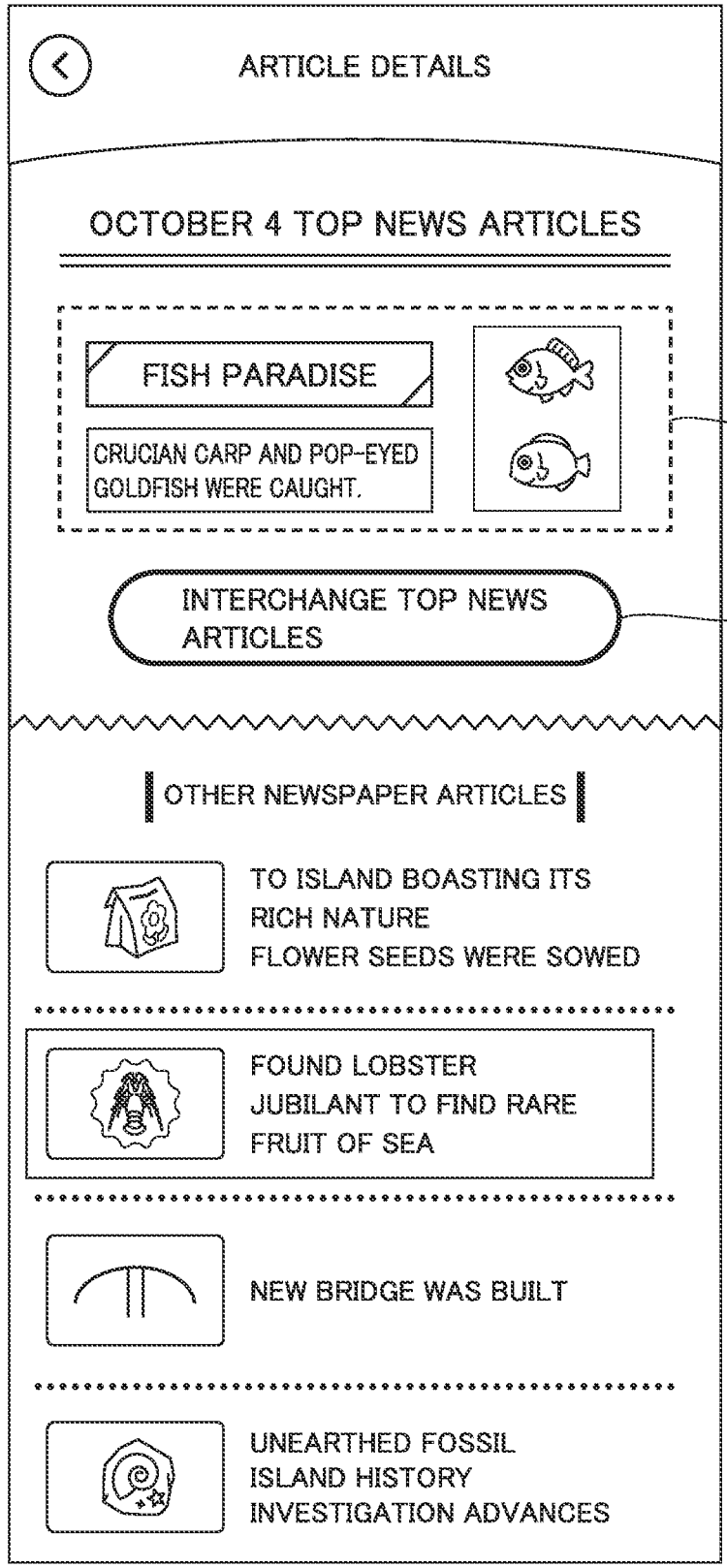
FIG. 14 shows an exemplary illustrative non-limiting drawing illustrating an exemplary screen showing details of an article object provided by the information processing system according to the present embodiment.

Referring to FIG. 14, a screen 352 represents an example where details of article object 372-4 (see FIGS. 10 and 11) are shown.

More specifically, on screen 352, a detailed article object 378 showing details of article object 372-4 is arranged. An article object candidate 3720 corresponding to each of other in-game events that occurred within a unit period the same as the unit period within which the in-game event corresponding to selected article object 372-4 occurred is also arranged on screen 352. In other words, any article object candidate 3720 is based on another in-game event that occurred on the date (October 4) when the in-game event corresponding to article object 372-4 occurred.

Though FIG. 14 shows article object candidate 3720 composed of four article objects corresponding to other in-game events, a larger or smaller number of article objects may be shown.

On screen 352, an article object interchange button 3520 is arranged.

Figure 15:
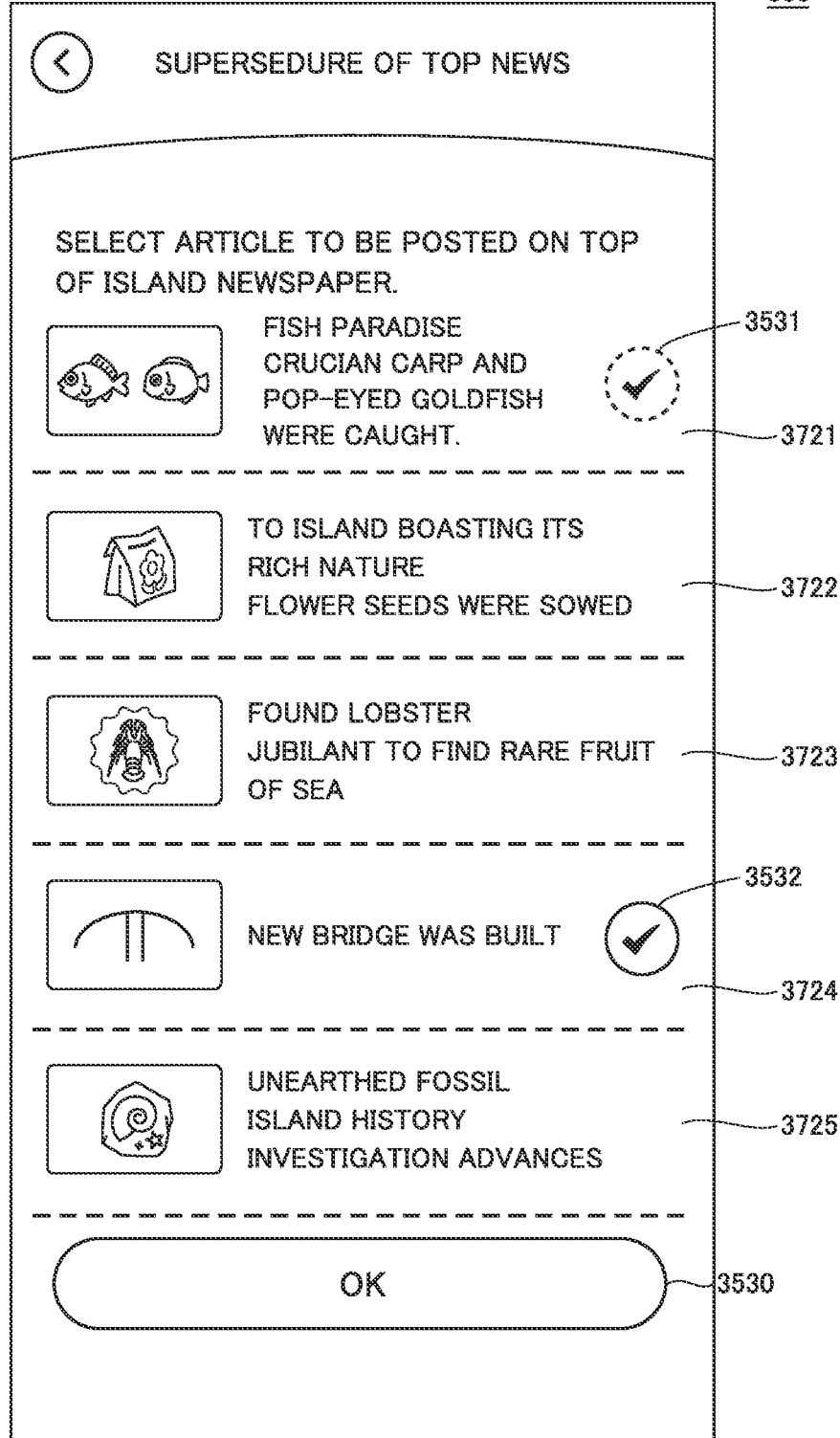
FIG. 15 shows an exemplary illustrative non-limiting drawing illustrating an exemplary screen where article objects provided by the information processing system according to the present embodiment are interchanged.

FIG. 15 shows an exemplary screen where article objects provided by information processing system 1 according to the present embodiment are interchanged. As interchange button 3520 in FIG. 14 is selected, a screen 353 shown in FIG. 15 is shown.

As shown in FIG. 15, on screen 353, article objects 3721 to 3725 corresponding to in-game events that occurred within the unit period the same as the unit period within which the in-game event corresponding to selected article object 372-4 occurred are arranged.

An item selected as article object 372-4 shown in the newspaper among article objects 3721 to 3725 is given a selection mark 3531. The user selects another article object that the user desires to be shown in the newspaper. Then, a new selection mark 3532 is given to the selected article object.

When a reflection button 3530 is selected, the article object given new selection mark 3532 is newly selected as article object 372-4 to be shown in the newspaper. In other words, contents in the article object shown in the newspaper are changed or updated.

A target of interchange of article object 372 as shown in FIG. 15 may be both of a newspaper in a process of creation and an already generated newspaper or only one of them. Furthermore, processing for interchanging article object 372 as shown in FIG. 15 does not have to be adopted. In this case, an initial state of arrangement of article objects 372 is maintained.

(e4: Processing for Extracting In-Game Event Corresponding to Article Object)

Exemplary processing for extracting an in-game event (event log) corresponding to an article object will now be described.

FIG. 16 is a diagram for illustrating exemplary processing for extracting an in-game event corresponding to an article object in information processing system 1 according to the present embodiment.

As shown in FIG. 16, processing target event log 130 includes date information 1301 indicating a date of occurrence of an in-game event, content information 1302 on contents of an in-game event, and additional information 1303 on a corresponding in-game event.

A score 1304 and a rank 1305 are calculated for an in-game event (an event log based on the in-game event) which is each entry in processing target event log 130. Score 1304 is a value calculated in accordance with a corresponding in-game event and used as a reference for selection of an item to be extracted as the article object. In other words, score 1304 represents an exemplary priority.

Rank 1305 is allocated in the descending order of magnitude of calculated scores 1304 of entries. FIG. 16 shows an example where top five scores are selected.

Score 1304 is calculated based on contents of an in-game event in accordance with a predetermined criterion. For example, for an in-game event relatively low in frequency of occurrence, a larger value may be calculated as the score. Alternatively, for an in-game event that is more likely to remain as a memory of a player, a larger value may be calculated as the score.

A parameter such as the number of catches of insects or fish may be reflected on calculation of score 1304. In other words, as more insects or fish are caught, the score may be larger.

When a plurality of in-game events attain to highest score 1304, superiority may be determined based on the parameter as described above, or when the parameter cannot be referred to, superiority may randomly be determined.

When the selected in-game event is the same as the in-game event selected as the top article object in an immediately preceding unit period (for example, one day before), an in-game event ranked second may be selected as the top article object.

For text describing contents of the in-game event, a plurality of patterns may be prepared in advance and a pattern to be used may randomly be determined. In this case, for the same articles (for example, seven articles), a pattern different from a pattern selected for the same in-game event may be selected. In other words, consecutive selection of the same pattern for the same in-game event may be avoided.

Thus, all event logs included in processing target event log 130 are not transmitted to portable apparatus 300, but at least one of processing target event logs 130 (see FIG. 19B) or display data 132 (see FIG. 8) generated based on the at least one of processing target event logs 130 may be transmitted to portable apparatus 300.

When there is an event log based on an area event of player 152-2 even when there is no event log 1160-1 based on an in-game event performed by player 152-1 within a unit period to be processed in processing target event log 130, an article object is generated based on the area event of player 152-2.

[F. Functional Configuration]

An exemplary functional configuration for information processing system 1 according to the present embodiment to perform processing as described above will now be described.

Figure 17:
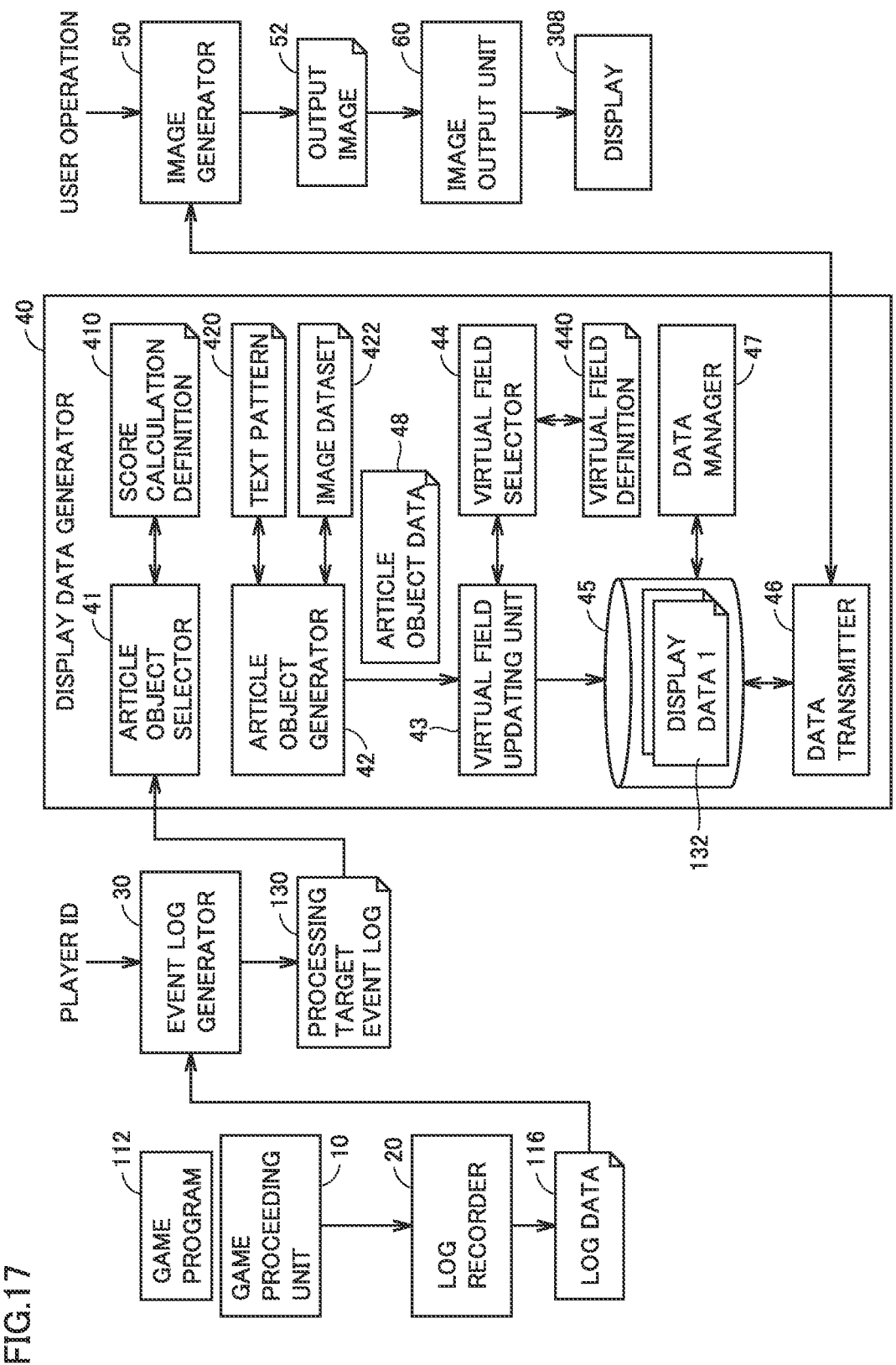
FIG. 17 shows an exemplary illustrative non-limiting drawing illustrating an exemplary functional configuration in the information processing system according to the present embodiment.

Referring to FIG. 17, game proceeding unit 10 proceeds with a game in accordance with game program 112.

Event log 1160 relating to each player 152 is successively recorded in log recorder 20 and added to log data 116 while log recorder 20 refers to proceeding of the game by game proceeding unit 10 (see FIG. 7).

Event log generator 30 generates processing target event log 130 relating to the subject player from log data 116 in accordance with designation of a player ID specific to the subject player (see FIG. 9). When type information 1166 for distinguishing between the player event and the area event is not given to each entry included in event log 1160, event log generator 30 may determine whether each entry falls under the player event or the area event.

Display data generator 40 generates display data from processing target event log 130. More specifically, display data generator 40 includes an article object selector 41, an article object generator 42, a virtual field updating unit 43, a virtual field selector 44, a data storage 45, a data transmitter 46, and a data manager 47.

Article object selector 41 selects one or more in-game events of interest of article objects among in-game events included in processing target event log 130 relating to the subject player by referring to score calculation definition 410 (see FIG. 16). Score calculation definition 410 includes definition for calculating a score corresponding to the in-game event.

Article object generator 42 generates article object data 48 corresponding to the in-game event selected by article object selector 41. Article object data 48 is composed of data for output of article object 372 shown in FIG. 10 and the like.

Article object generator 42 thus generates article object 372 which is the virtually arranged object based on the event log within the unit period of actual time among event logs about in-game events that occurred based on the in-game activities in virtual game space 150. At this time, article object generator 42 may generate article object 372 based on the event log determined based on a priority (score 1304) set for each event, among event logs. Without using the priority, article object generator 42 may randomly generate article object 372.

More specifically, article object generator 42 determines text corresponding to the in-game event by referring to a text pattern 420 and determines or generates an image corresponding to the in-game event by referring to an image dataset 422. Text pattern 420 includes one or more text patterns prepared in advance for each in-game event. Image dataset 422 includes one or more images prepared in advance for each in-game event.

Article object data 48 includes date information indicating a date of occurrence of the in-game event of interest, an image showing the in-game event of interest, and text describing contents of the in-game event of interest.

Virtual field updating unit 43 arranges article object data 48 in the virtual field. Display data 132 in a process of update by virtual field updating unit 43 or display data 132 in the past is stored in data storage 45. Display data 132 "in a process of update" means latest article object 372 and corresponds to a state in which article object data 48 is arranged in no area in a corresponding virtual field. Display data 132 "in the past" means article object 372 other than the latest article object and corresponds to a state in which article object data 48 is arranged in all areas in a corresponding virtual field. Display data 132 "in the past" means an already generated newspaper.

More specifically, when a predetermined condition is satisfied (for example, when there is article object data 48 based on an in-game event that occurs on a new date), virtual field updating unit 43 allocates article object data 48 to a virtual field currently in a process of update or a newly selected virtual field. Display data 132 is generated by allocation of article object data 48 to the virtual field. Thus, virtual field updating unit 43 arranges article object data 48 (virtually arranged object) in the virtual field which is a unit for generation of an image to be shown on display 308 of portable apparatus 300.

Virtual field selector 44 selects a screen layout of the virtual field where article object data 48 is to be arranged, by referring to virtual field definition 440, in accordance with a request from virtual field updating unit 43.

Specifically, when article object data 48 is allocated to all areas in the virtual field, a new virtual field is generated. Article object data 48 is allocated to each area in the newly generated virtual field. Virtual field updating unit 43 thus has the virtual field stored as display data 132 in the past (past object) together with article object data 48, based on arrangement of a reference number of (for example, seven) pieces of article object data 48 (virtually arranged object) in the virtual field. Virtual field selector 44 generates a new virtual field based on arrangement of the reference number of (for example, seven) pieces of article object data 48 in the virtual field.

When the number of pieces of article object data 48 arranged in the virtual field is smaller than the reference number, virtual field updating unit 43 arranges blank field object data corresponding to blank field object 374 in number short of the reference number in the virtual field. Then, when virtual field updating unit 43 newly arranges article object data 48 in the virtual field, it arranges article object data 48 at a position of the blank field object data. By performing such processing for arranging blank field object data and updating arrangement of the blank field object data with article object data 48, a newspaper in a process of creation as shown in FIG. 11 can be shown.

Unless blank field object data arranged in the virtual field is updated with article object data 48, it is maintained as it is. In other words, when at least one piece of article object data 48 is arranged in the virtual field, virtual field updating unit 43 maintains the position of the blank field object until the reference number of pieces of article object data 48 are arranged in the virtual field.

Areas may be different in size from one another depending on the selected virtual field. In this case, article object generator 42 may generate article object data 48 different in contents based on the size of the area where virtually arranged object is arranged. "Different contents" means that a size of an image or a length of the text is different depending on the size of the area where the virtually arranged object is arranged.

Virtual field updating unit 43 changes article object data 48 (top article object) arranged as display data 132 in a process of update or display data 132 in the past, in accordance with an operation by the user (see FIG. 15).

In other words, also after article object data 48 (top article object) is arranged in the virtual field currently in a process of update, based on an operation by the user, virtual field updating unit 43 arranges in the virtual field, instead of article object data 48, another piece of article object data 48 generated based on an event included in an event log within the unit period the same as the unit period within which that article object data 48 was generated. In addition, also after the virtual field is stored as the virtual field in the past, based on an operation by the user, virtual field updating unit 43 arranges in the virtual field, instead of article object data 48 arranged as the top article object, another piece of article object data 48 generated based on the event included in the event log within the unit period the same as the unit period within which the virtually arranged object was generated.

Data transmitter 46 transmits some of display data 132 stored in data storage 45 in response to a request from image generator 50 or a predetermined condition is satisfied.

When a storage period of display data 132 stored in data storage 45 exceeds a predetermined value, data manager 47 erases display data 132 the storage period of which has exceeded the predetermined value. In an example where processing target event log 130 is also stored in data storage 45, data manager 47 erases also processing target event log 130 when a storage period exceeds a predetermined value.

Data manager 47 thus erases processing target event log 130 or display data 132 from a data storage area after lapse of a storage period.

FIG. 18 shows an exemplary data structure of display data 132 in information processing system 1 according to the present embodiment. FIG. 18 shows an exemplary data structure of a portion corresponding to article object group 370 (FIGS. 10 and 11) as some of display data 132. As shown in FIG. 18, display data 132 includes a virtual field ID 1321 for specifying a virtual field where an article object is to be arranged and area definitions 1322-1, 1322-2, . . . that define contents to be shown in each area in the virtual field. Each of area definitions 1322-1, 1322-2, . . . includes a date 1323 corresponding to the article object and information on article object data 48. Each piece of article object data 48 includes text describing contents of an in-game event of interest and an image showing the in-game event of interest.

The text included in each piece of article object data 48 may be message designation information for referring to a table of messages prepared in advance for availability in multiple languages. For example, rather than text itself such as "caught cabbage butterfly" shown in FIG. 7A, an ID or a numeric value indicating contents such as "caught cabbage butterfly" is used for recording in an event log. In generation of article object data 48 or the like, text corresponding to the ID or the numeric value included in the corresponding event log is obtained from server apparatus 200 or the like. At this time, portable apparatus 300 can obtain the text corresponding to a language to be used for display on portable apparatus 300 by preparation of text in multiple languages in advance in server apparatus 200 in correspondence with the ID or the numeric value.

An image included in each piece of article object data 48 may be image data itself or image designation information for specifying image data arranged in an area accessible by portable apparatus 300.

Display data 132 may include not only article object data corresponding to an article object shown as a top article on each day but also one or more pieces of article object data corresponding to one or more article objects that may be substitutes for top articles.

Referring again to FIG. 17, image generator 50 obtains display data 132 stored in data storage 45 of display data generator 40 in accordance with an operation by the user. Image generator 50 generates an output image 52 from obtained display data 132. Output image 52 is an image to be shown on display 308 of portable apparatus 300, and generated by rendering of display data 132.

When a plurality of pieces of display data 132 in the past (newspapers generated in the past) are stored, portable apparatus 300 accepts selection from a user as shown in FIG. 13 described above. Data transmitter 46 transmits display data 132 in accordance with selection by the user to image generator 50.

When there are a plurality of pieces of display data 132 in the past, image generator 50 thus generates output image 52 based on display data 132 designated by the user.

Image output unit 60 outputs output image 52 to display 308 of portable apparatus 300.

Without being limited to the exemplary functional configuration shown in FIG. 8, allocation of functions among game device 100, server apparatus 200, and portable apparatus 300 may freely be modified.

Another exemplary functional configuration involved with providing in-game information based on an event log in information processing system 1 according to the present embodiment will be described with reference to FIGS. 19A to 19D.

Figure 19:
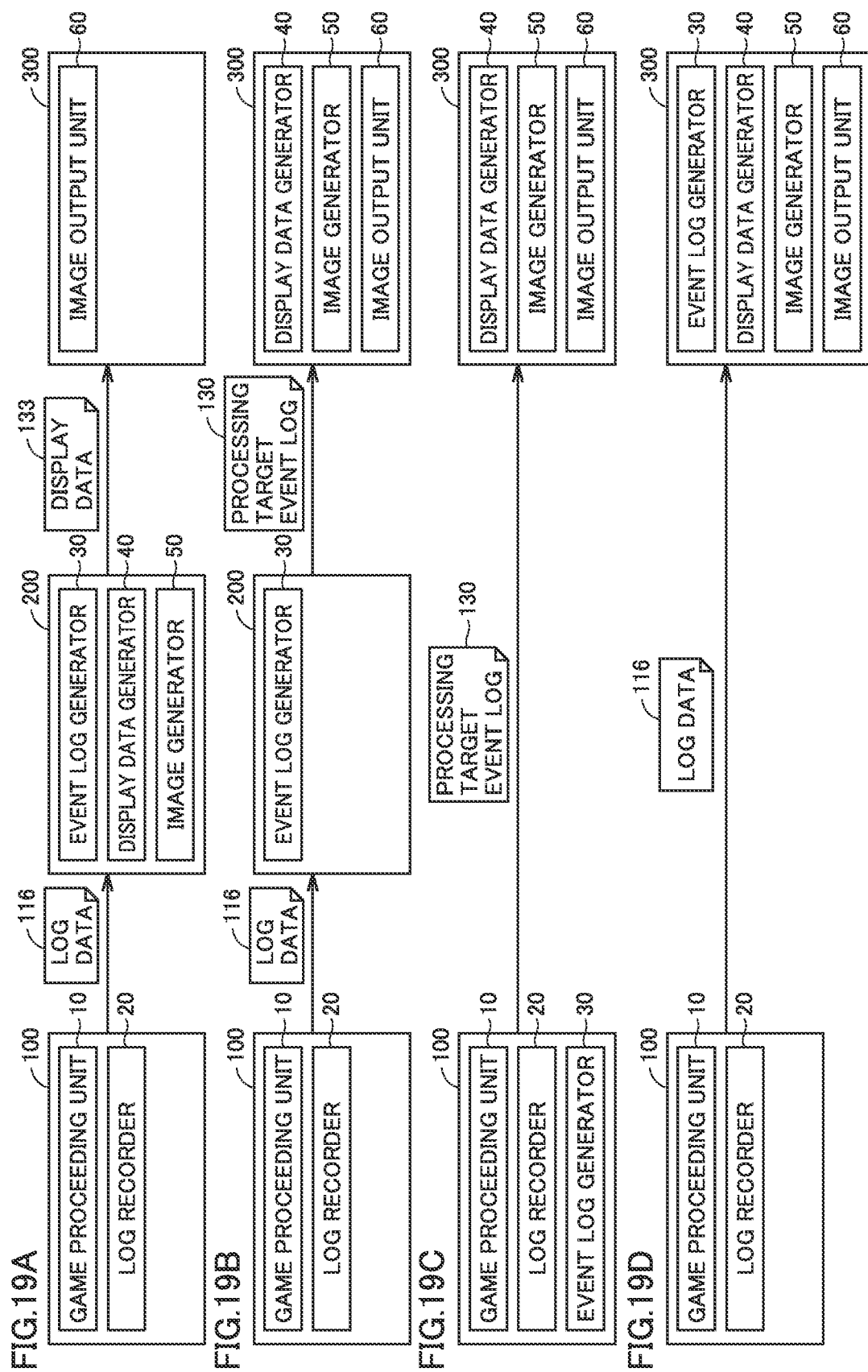
FIGS. 19A to 19D show exemplary illustrative non-limiting drawings each illustrating another exemplary functional configuration involved with providing in-game information based on an event log in the information processing system according to the present embodiment.

FIG. 19A shows an exemplary functional configuration in which server apparatus 200 generates display data 133. Display data 133 is image data generated based on processing target event log 130 for representation on display 308 of portable apparatus 300. In other words, display data 133 includes an output image generated by image generator 50.

More specifically, game device 100 includes game proceeding unit 10 and log recorder 20. Game device 100 transmits log data 116 including event log 1160 relating to the subject player to server apparatus 200.

Server apparatus 200 includes event log generator 30, display data generator 40, and image generator 50. Server apparatus 200 transmits as output data, generated display data 133 to portable apparatus 300.

Portable apparatus 300 includes image output unit 60 that outputs display data 133 to display 308 of portable apparatus 300. Image output unit 60 has the output image based on display data 133 received by portable apparatus 300 shown on display 308.

FIG. 19B shows an exemplary functional configuration in which server apparatus 200 generates processing target event log 130. More specifically, game device 100 includes game proceeding unit 10 and log recorder 20. Game device 100 transmits log data 116 including event log 1160 relating to the subject player to server apparatus 200.

Server apparatus 200 includes event log generator 30. Server apparatus 200 transmits generated processing target event log 130 to portable apparatus 300 as output data.

Portable apparatus 300 includes display data generator 40, image generator 50, and image output unit 60. Image output unit 60 outputs the output image based on processing target event log 130 received by portable apparatus 300 to display 308.

FIG. 19C shows an exemplary functional configuration in which game device 100 generates processing target event log 130. More specifically, game device 100 includes game proceeding unit 10, log recorder 20, and event log generator 30. Game device 100 transmits as output data, processing target event log 130 to portable apparatus 300.

Portable apparatus 300 includes display data generator 40, image generator 50, and image output unit 60. Image output unit 60 generates an output image based on processing target event log 130 received by portable apparatus 300 and outputs the generated output image to display 308.

FIG. 19D shows an exemplary functional configuration in which portable apparatus 300 generates processing target event log 130. More specifically, game device 100 includes game proceeding unit 10 and log recorder 20. Game device 100 transmits as output data, log data 116 to portable apparatus 300.

Portable apparatus 300 includes event log generator 30, display data generator 40, image generator 50, and image output unit 60. Image output unit 60 outputs the output image based on log data 116 received by portable apparatus 300 to display 308.

For example, in output of the output image directed to player 152-1 to display 308, portable apparatus 300 receives log data 116 including the event log based on the player event of player 152-2. Image output unit 60, however, outputs the output image not including information based on the event log based on the player event relating to player 152-2 to display 308.

Though FIGS. 8 and 19A to 19D show some implementations for realizing provision of in-game information through portable apparatus 300 based on an event log, any implementation can be adopted without being limited to such implementations.

For example, all functions may be implemented in game device 100. In this case, game device 100 generates and outputs an output image based on log data 116 recorded in log recorder 20.

In a modification of FIG. 8, server apparatus 200 may include only article object selector 41 in display data generator 40, in addition to event log generator 30. In this case, a function of display data generator 40 other than article object selector 41 is implemented in portable apparatus 300. In other words, server apparatus 200 may perform processing up to selection of an in-game event from which article object data 48 is to be generated, and portable apparatus 300 may perform processing necessary for subsequent generation and output of an output image.

[G. Processing Procedure]

An exemplary processing procedure for information processing system 1 according to the present embodiment to realize processing as described above will now be described.

Figure 20:
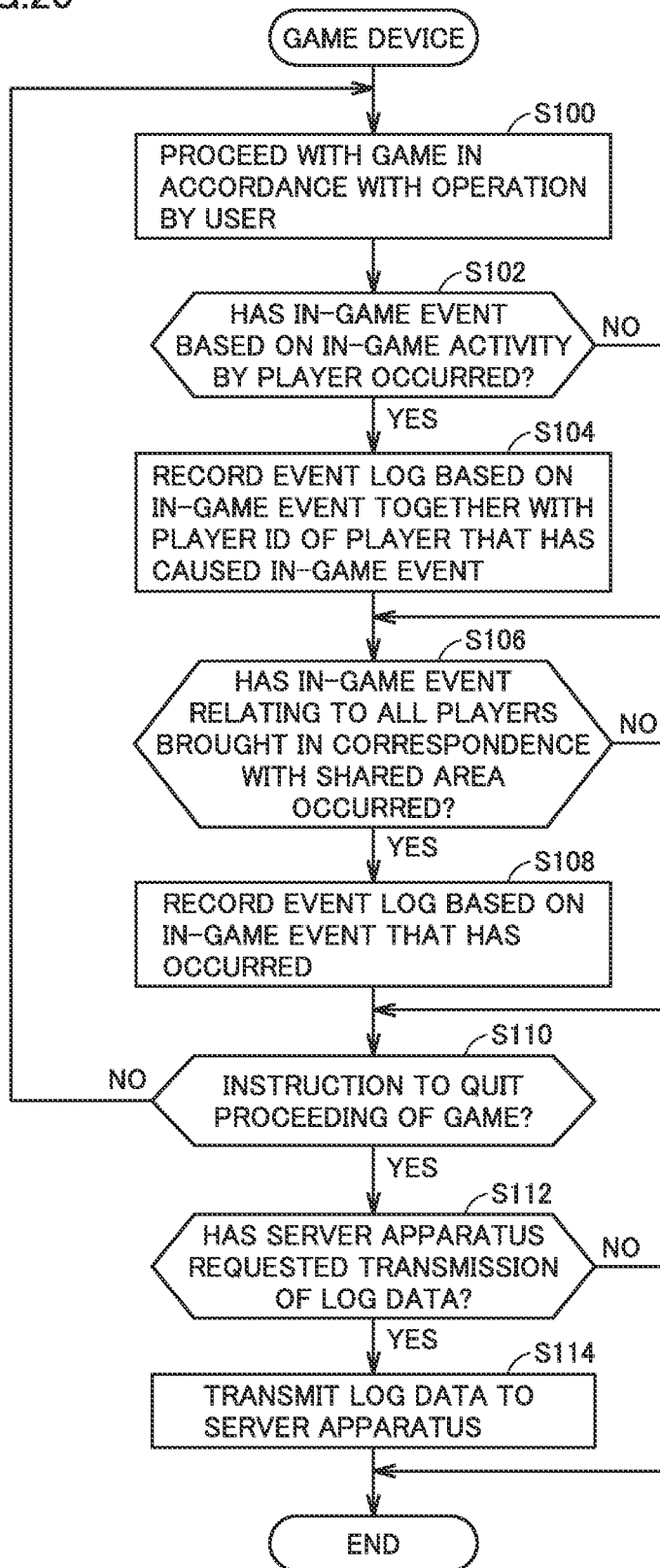
FIG. 20 shows an exemplary illustrative non-limiting flowchart showing a procedure of processing performed in the game device of the information processing system according to the present embodiment.

FIG. 20 shows an exemplary procedure of processing performed in game device 100 of information processing system 1 according to the present embodiment. Each step shown in FIG. 20 is typically performed by execution of game program 112 by processor 102 of game device 100.

Referring to FIG. 20, game device 100 proceeds with a game in accordance with an operation by the user (step S100). Game device 100 determines whether or not an in-game event based on an in-game activity by player 152 has occurred (step S102). When the in-game event based on the in-game activity by any player 152 has occurred (YES in step S102), game device 100 has an event log based on the in-game event recorded together with a player ID of the player who has caused the in-game event (step S104).

When an in-game event based on an in-game activity by player 152 has not occurred (NO in step S102), processing in step S104 is skipped.

In shared area 154 in virtual game space 150, whether or not an in-game event relating to all players 152 brought in correspondence with shared area 154 has occurred is determined (step S106). When an in-game event relating to all players 152 brought in correspondence with shared area 154 has occurred (YES in step S106), game device 100 has the event log based on the in-game event that has occurred recorded (step S108).

When an in-game event relating to all players 152 brought in correspondence with shared area 154 has not occurred (NO in step S106), processing in step S108 is skipped.

Game device 100 determines whether or not an instruction to quit proceeding of the game has been given (step S110). When the instruction to quit proceeding of the game has not been given (NO in step S110), processing in step S100 or later is repeated.

When the instruction to quit proceeding of the game has been given (YES in step S110), game device 100 determines whether or not server apparatus 200 has requested transmission of log data 116 (step S112).

When server apparatus 200 has requested transmission of log data 116 (YES in step S112), game device 100 transmits log data 116 to server apparatus 200 (step S114). Then, the process ends.

When server apparatus 200 has not requested transmission of log data 116 (NO in step S112), processing in step S114 is skipped. Then, the process ends.

Figure 21:
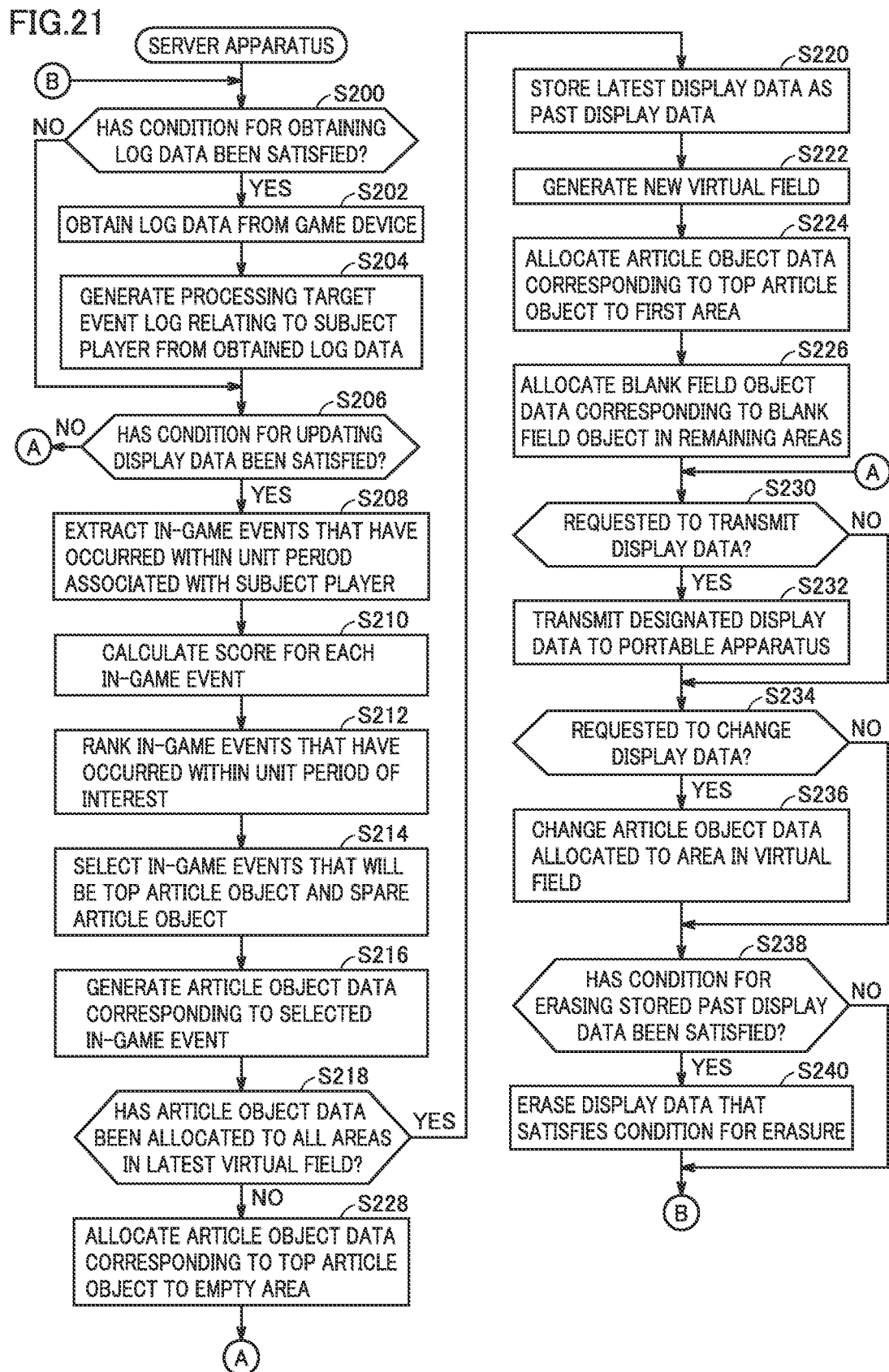
FIG. 21 shows an exemplary illustrative non-limiting flowchart showing a procedure of processing performed in the server apparatus of the information processing system according to the present embodiment.

FIG. 21 shows an exemplary procedure of processing performed in server apparatus 200 of information processing system 1 according to the present embodiment. Each step shown in FIG. 21 is typically performed by execution of application program 212 by processor 202 of server apparatus 200.

Referring to FIG. 21, server apparatus 200 determines whether or not a condition for obtaining log data 116 has been satisfied (step S200). The condition for obtaining log data 116 includes, for example, a condition that data can be communicated with game device 100 of interest and a prescribed time period has elapsed since game device 100 obtained log data 116.

When the condition for obtaining log data 116 has been satisfied (YES in step S200), server apparatus 200 obtains log data 116 from game device 100 (step S202). At this time, game device 100 may be requested to transmit log data 116.

Server apparatus 200 generates processing target event log 130 relating to the subject player from obtained log data 116 in accordance with designation of the player ID specific to the subject player (step S204).

When the condition for obtaining log data 116 has not been satisfied (NO in step S200), processing in steps S202 and S204 is skipped.

In succession, server apparatus 200 determines whether or not a condition for updating display data 132 has been satisfied (step S206). The condition for updating display data 132 includes, for example, lapse of a unit period or longer since previous update (or generation) of display data 132.

When the condition for updating display data 132 has been satisfied (YES in step S206), server apparatus 200 extracts in-game events that occurred within the unit period from in-game events included in processing target event log 130 relating to the subject player (step S208) and calculates the score for each of the extracted in-game events that occurred within the unit period (step S210). Then, server apparatus 200 ranks the in-game events that occurred within the unit period of interest based on each calculated score (step S212) and selects an in-game event to be a top article object and an in-game event to be a spare article object for the unit period of interest (step S214).

In succession, server apparatus 200 generates article object data 48 corresponding to the selected in-game event (step S216). Server apparatus 200 determines whether or not article object data 48 has already been allocated to all areas in the virtual field for latest display data 132 (step S218).

When article object data 48 has already been allocated to all areas in the virtual field for latest display data 132 (YES in step S218), server apparatus 200 has latest display data 132 stored as display data 132 in the past (step S220), and generates a new virtual field (step S222). The screen layout in the new virtual field may randomly be determined or determined under a predetermined rule. Server apparatus 200 allocates article object data 48 corresponding to a top article object in a first area in the newly generated virtual field (step S224) and allocates blank field object data corresponding to a blank field object in remaining areas (step S226).

When article object data 48 has been allocated only to at least one area in the virtual field for latest display data 132 (NO in step S218), server apparatus 200 allocates article object data 48 corresponding to the top article object to an empty area for latest display data 132 (step S228). At this time, the blank field object data that has been allocated to article object data 48 is updated with article object data 48.

Through processing above, generation or update of display data 132 is completed.

When the condition for updating display data 132 has not been satisfied (NO in step S206), processing in steps S208 to S228 is skipped.

In succession, server apparatus 200 determines whether or not it has been requested to transmit display data 132 by portable apparatus 300 (step S230).

When server apparatus 200 has been requested to transmit display data 132 by portable apparatus 300 (YES in step S230), server apparatus 200 transmits designated display data 132 to portable apparatus 300 (step S232). Server apparatus 200 adds information for showing seasonal topic 360 and price log 380 (see FIG. 10 and the like for both of them) to display data 132 as necessary.

In other words, server apparatus 200 may transmit to portable apparatus 300, information on an in-game event that will occur in the future (future event data) independently of an in-game activity performed by player 152 and information on an in-game event that occurred in the past (past event data) independently of an in-game activity performed by player 152.

When portable apparatus 300 has not requested transmission of display data 132 (NO in step S230), processing in step S232 is skipped.

In succession, server apparatus 200 determines whether or not it has been requested to change display data 132 by portable apparatus 300 (step S234).

When server apparatus 200 has been requested to change display data 132 by portable apparatus 300 (YES in step S234), server apparatus 200 changes article object data 48 allocated to an area in the virtual field as requested (step S236). In other words, server apparatus 200 changes the article object shown as the top article in accordance with the request from portable apparatus 300.

When portable apparatus 300 has not requested change of display data 132 (NO in step S234), processing in step S236 is skipped.

In succession, server apparatus 200 determines whether or not a condition for erasure of stored display data 132 in the past has been satisfied (step S238).

When the condition for erasure has been satisfied for at least one of pieces of stored display data 132 in the past (YES in step S238), server apparatus 200 erases display data 132 that satisfies the condition for erasure (step S240). Server apparatus 200 may erase corresponding processing target event log 130.

When none of pieces of stored display data 132 in the past satisfies the condition for erasure (NO in step S238), processing in step S240 is skipped.

Figure 22:
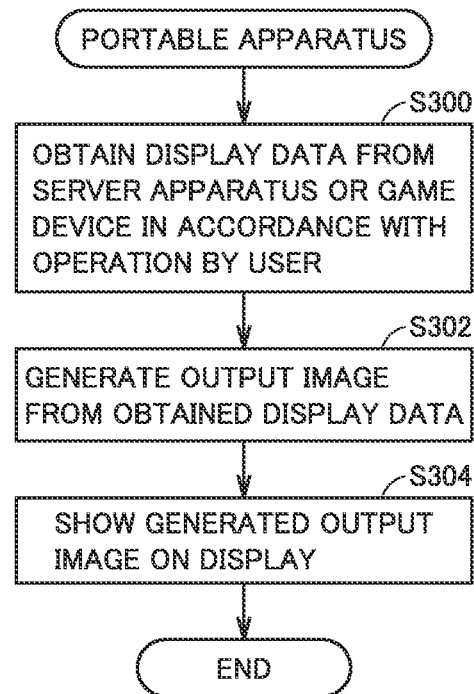
FIG. 22 shows an exemplary illustrative non-limiting flowchart showing a procedure of processing performed in the portable apparatus of the information processing system according to the present embodiment.

FIG. 22 shows an exemplary procedure of processing performed in portable apparatus 300 of information processing system 1 according to the present embodiment. Each step shown in FIG. 22 is typically performed by execution of application program 312 by processor 302 of portable apparatus 300.

Referring to FIG. 22, portable apparatus 300 obtains display data 132 from server apparatus 200 or game device 100 in accordance with an operation by the user (step S300). Portable apparatus 300 generates output image 52 from obtained display data 132 (step S302). Portable apparatus 300 has generated output image 52 shown on display 308 (step S304).

When server apparatus 200 transmits to portable apparatus 300, information based on an in-game event that will occur in the future (future event data) independently of an in-game activity performed by player 152 and information based on an in-game event that occurred in the past (past event data) independently of an in-game activity performed by player 152, output image t52 based on the future event data and/or the past event data is shown on display 308 in addition to display data 132.

[H. Other Forms]

Though an exemplary configuration where each game device 100 provides virtual game space 150 is described above, the server apparatus may provide common virtual game space 150, and a plurality of shared areas 154 with which one or more players 152 are brought in correspondence altogether may be prepared for provided common virtual game space 150.

Though an exemplary configuration in which processing (see FIG. 15) for changing a top article object in accordance with an operation by the user is performed by processing by display data generator 40 (virtual field updating unit 43) is illustrated in the description above, without being limited as such, it may be performed by processing by image generator 50. In this case, image generator 50 obtains raw material data including article object 372 which is an interchange candidate, in addition to the top article object, and generates an obtained image by collecting necessary raw material data in accordance with an operation by the user. Furthermore, display data generator 40 and image generator 50 may perform, in coordination, processing for changing the top article object in accordance with an operation by the user.

[I. Advantages]

In information processing system 1 according to the present embodiment, article object 372 about not only an in-game event that occurs based on an in-game activity by the subject player but also an in-game event that causes change of the state of arrangement in shared area 154 as a result of an in-game activity by a player other than the subject player is outputted. The subject player (user) can thus know on portable apparatus 300 or the like, that the state of arrangement in shared area 154 has changed (for example, a new building was built) by another player who lives in the same shared area 154 while the subject player has not played the game. Such information strongly motivates the user to play the game.

In information processing system 1 according to the present embodiment, an experience in virtual game space 150 by the player or an event that occurs in shared area 154 is outputted in a form of one or more article objects arranged in the virtual field. By adopting such a form of output, checking by the user of various records in the past is facilitated.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising:
a memory storing a computer-readable program; and
one or more processors, when executing the computer-readable program, that perform
generating at least one virtually arranged object for a target game player of multiple game players based on a processing target event log within a unit period of actual time about in-game events that occur based on in-game activities in a virtual game space, the virtual game space being shared by the multiple game players, where the processing target event log is generated from events in an event log of the target game player and events in event logs from other of the multiple game players, the event log of the target game player contains in-game events caused by the target game player in the virtual game space and in-game events which cause a change in the virtual game space caused by other game players of the multiple game players, the events used to generate the processing target event log from the event logs from the other of the multiple game players include the in-game events which cause a change in the virtual game space caused by game players different from the game player associated with the event log, respectively,
arranging one or more of the at least one virtually arranged objects in a virtual field which is a unit for generating an output image to be shown on a display,
storing the virtual field together with the one or more of the at least one virtually arranged objects as a past object based on arrangement of a reference number of virtually arranged objects in the virtual field,
arranging one or more of the at least one virtually arranged objects in another virtual field when the reference number of virtually arranged objects are arranged in the virtual field, and
generating the output image based on at least one of the stored virtual field or the another virtual field, for display on the display.

2. The information processing system according to claim 1, wherein
the arranging one or more of the at least one virtually arranged objects in the virtual field comprises
arranging a blank field object in number short of the reference number in the virtual field when the number of virtually arranged objects arranged in the virtual field is smaller than the reference number, and
arranging a virtually arranged object at a position of the blank field object when a virtually arranged object is newly arranged in the virtual field.

3. The information processing system according to claim 2, wherein
the arranging one or more of the at least one virtually arranged objects in the virtual field comprises maintaining the position of the blank field object until the reference number of virtually arranged objects are arranged in the virtual field when one or more virtually arranged object is arranged in the virtual field.

4. The information processing system according to claim 1, wherein
the generating the output image comprises generating the output image based on a past object designated by a user when there is a plurality of the past objects.

5. The information processing system according to claim 1, wherein
the generating the at least one virtually arranged object comprises generating one virtually arranged object based on the processing target event log on one day.

6. The information processing system according to claim 1, wherein
the generating the at least one virtually arranged object comprises generating the at least one virtually arranged object based on the processing target event log determined based on a priority set for each in-game event among the processing target event log.

7. The information processing system according to claim 1, wherein
the generating the at least one virtually arranged object comprises generating the at least one virtually arranged object different in content, based on a size of an area where a virtually arranged object is arranged.

8. The information processing system according to claim 1, wherein
the arranging of the one or more of the at least one virtually arranged objects in another virtual field occurs when seven virtually arranged objects are arranged in the virtual field.

9. The information processing system according to claim 1, wherein
the arranging one or more of the at least one virtually arranged objects in the virtual field comprises arranging in the virtual field, also after the one or more of the at least one virtually arranged objects is arranged in the virtual field, based on an operation by a user, instead of a virtually arranged object, another virtually arranged object generated based on an in-game event included in the processing target event log within the unit period identical to the unit period within which the one or more virtually arranged objects were generated.

10. The information processing system according to claim 9, wherein
the arranging one or more of the at least one virtually arranged objects in the virtual field comprises arranging in the virtual field, also after the virtual field is stored as the past object, based on the operation by the user, instead of a virtually arranged object, another virtually arranged object generated based on the in-game event included in the processing target event log within the unit period identical to the unit period within which the one or more virtually arranged objects were generated.

11. The information processing system according to claim 1, comprising:
a game device in which the event log of the target game player is recorded; and
an information processing apparatus that generates the output image.

12. The information processing system according to claim 11, further comprising a server apparatus that generates the at least one virtually arranged object, arranges one or more of the at least one virtually arranged objects, stores the virtual field, and arranges the one or more of the at least one virtually arranged objects in the another virtual field.

13. The information processing system according to claim 12, wherein
the game device transmits the event log of the target game player and/or information based on the event log of the target game player to the information processing apparatus and/or the server apparatus.

14. The information processing system according to claim 1, wherein each in-game event in an event log includes type information indicating whether the in-game event had been caused by a game player corresponding to the event log in the virtual game space or by other game players of the multiple game players.

15. The information processing system according to claim 1, wherein each in-game event in an event log includes time and day information indicating a time and a day of an occurrence of the in-game event.

16. The information processing system according to claim 1, wherein the one or more processors generate the processing target event log is different for different game players of the multiple game players.

17. A non-transitory computer-readable storage medium with an executable information processing program stored thereon, the program causing one or more processors to perform:
   generating at least one virtually arranged object based on a processing target event log within a unit period of actual time about in-game events that occur based on in-game activities in a virtual game space, the virtual game space being shared by multiple game players, the processing target event log being generated by at least one event log, the at least one event log including a first event log of a first game player, the first event log containing in-game events caused by the first game player in the virtual game space and in-game events which cause a change in the virtual game space caused by other game players of the multiple game players;
   arranging one or more of the at least one virtually arranged objects in a virtual field which is a unit for generating an output image to be shown on a display;
   storing the virtual field together with the one or more of the at least one virtually arranged objects as a past object based on arrangement of a reference number of virtually arranged objects in the virtual field;
   arranging one or more of the at least one virtually arranged objects in another virtual field when the reference number of virtually arranged objects are arranged in the virtual field; and
   transmitting at least one of the virtual field or the another virtual field.

18. An information processing apparatus comprising:
   a memory storing a computer-readable program; and
   one or more processors, when executing the computer-readable program, that perform
      generating at least one virtually arranged object based on a processing target event log within a unit period of actual time about in-game events that occur based on in-game activities in a virtual game space, the virtual game space being shared by multiple game players, the processing target event log being generated by at least one event log, the at least one event log including a first event log of a first game player, the first event log containing in-game events caused by the first game player in the virtual game space and in-game events which cause a change in the virtual game space caused by other game players of the multiple game players,
      arranging one or more of the at least one virtually arranged objects in a virtual field which is a unit for generating an output image to be shown on a display,
      storing the virtual field together with the one or more of the at least one virtually arranged objects as a past object based on arrangement of a reference number of virtually arranged objects in the virtual field,
      arranging one or more of the at least one virtually arranged objects in another virtual field when the reference number of virtually arranged objects are arranged in the virtual field, and
      transmitting at least one of the virtual field or the another virtual field.

19. The non-transitory computer-readable storage medium with an executable information processing program stored thereon according to claim 17, wherein the at least one event log including a second event log of a second game player, and wherein the processing target event log is further generated from in-game events in the second event log which cause a change in the virtual game space caused by game players different from the second game player.

20. The non-transitory computer-readable storage medium with an executable information processing program stored thereon according to claim 17, wherein
   the arranging one or more of the at least one virtually arranged objects in the virtual field comprises
      arranging a blank field object in number short of the reference number in the virtual field when the number of virtually arranged objects arranged in the virtual field is smaller than the reference number, and
      arranging a virtually arranged object at a position of the blank field object when a virtually arranged object is newly arranged in the virtual field.

21. The non-transitory computer-readable storage medium with an executable information processing program stored thereon according to claim 20, wherein
   the arranging one or more of the at least one virtually arranged objects in the virtual field comprises maintaining the position of the blank field object until the reference number of virtually arranged objects are arranged in the virtual field when one or more virtually arranged objects is arranged in the virtual field.

22. The non-transitory computer-readable storage medium with an executable information processing program stored thereon according to claim 17, wherein
   the generating the output image comprises generating the output image based on a past object designated by a user when there is a plurality of the past objects.

23. The non-transitory computer-readable storage medium with an executable information processing program stored thereon according to claim 17, wherein
   the generating the at least one virtually arranged object comprises generating one virtually arranged object based on the processing target event log on one day.

24. An information processing method performed in an information processing apparatus, the information processing method comprising:
   generating at least one virtually arranged object based on a processing target event log within a unit period of actual time among in-game events that occur based on in-game activities in a virtual game space, the virtual game space being shared by multiple game players, the processing target event log being generated by at least one event log, the at least one event log including a first event log of a first game player, the first event log containing in-game events caused by the first game player in the virtual game space and in-game events which cause a change in the virtual game space caused by other game players of the multiple game players;
   arranging one or more of the at least one virtually arranged objects in a virtual field which is a unit for generating an output image to be shown on a display;
   storing the virtual field together with the one or more of the at least one virtually arranged objects as a past object based on arrangement of a reference number of the virtually arranged objects in the virtual field;

arranging one or more of the at least one virtually arranged objects in another virtual field when the reference number of virtually arranged objects are arranged in the virtual field; and transmitting at least one of the virtual field or the another virtual field.

* * * * *